United States Patent
Hirano et al.

(10) Patent No.: US 11,997,119 B2
(45) Date of Patent: May 28, 2024

(54) VEHICLE LOG TRANSMISSION DEVICE, VEHICLE LOG ANALYSIS SERVER, VEHICLE LOG ANALYSIS SYSTEM, AND VEHICLE LOG TRANSMISSION/RECEPTION METHOD

(71) Applicant: Panasonic Intellectual Property Corporation of America, Torrance, CA (US)

(72) Inventors: Ryo Hirano, Osaka (JP); Takeshi Kishikawa, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 421 days.

(21) Appl. No.: 17/222,473

(22) Filed: Apr. 5, 2021

(65) Prior Publication Data

US 2021/0226974 A1 Jul. 22, 2021

Related U.S. Application Data

(63) Continuation of application No. PCT/JP2019/035423, filed on Sep. 9, 2019.

(30) Foreign Application Priority Data

Nov. 30, 2018 (JP) ................. 2018-224503

(51) Int. Cl.
*H04L 29/06* (2006.01)
*G07C 5/00* (2006.01)
(Continued)

(52) U.S. Cl.
CPC .......... *H04L 63/1425* (2013.01); *G07C 5/008* (2013.01); *G07C 5/0808* (2013.01);
(Continued)

(58) Field of Classification Search
CPC ........... H04L 63/1425; H04L 12/40169; H04L 2012/40215; H04L 2012/40273;
(Continued)

(56) References Cited

U.S. PATENT DOCUMENTS 9,843,594 B1 * 12/2017 Evans ................. H04L 63/1425
11,729,183 B2 * 8/2023 Park ........................ H04L 67/12
726/23
(Continued)

FOREIGN PATENT DOCUMENTS

JP 2002-163180 6/2002
JP 2010-097417 4/2010
(Continued)

OTHER PUBLICATIONS

A. Gazdag, L. Buttyan and Z. Szalay, "Efficient lossless compression of CAN traffic logs," 2017 25th International Conference on Software, Telecommunications and Computer Networks (SoftCOM), Split, Croatia, 2017, pp. 1-6, doi: 10.23919/SOFTCOM.2017. 8115527. (Year: 2017).*
(Continued)

*Primary Examiner* — Ka Shan Choy
(74) *Attorney, Agent, or Firm* — Greenblum & Bernstein, P.L.C.

(57) ABSTRACT

A vehicle log transmission device includes: a vehicle log division processor that generates one or more divided logs; existing identifier storage that stores an existing identifier list, which is a list of identifiers corresponding to existing divided logs generated by dividing an existing vehicle log shared between the vehicle log transmission device and a vehicle log analysis server; a vehicle log transmission necessity determiner that determines that a divided log corresponding to an identifier present in the existing identifier list is a first divided log, and that a divided log corresponding to
(Continued)

an identifier not present in the existing identifier list is a second divided log; and a vehicle-side communicator that transmits the identifier corresponding to the first divided log to the vehicle log analysis server, and transmits the second divided log to the vehicle log analysis server.

28 Claims, 15 Drawing Sheets

(51) Int. Cl.
     *G07C 5/08*       (2006.01)
     *H04L 9/40*       (2022.01)
     *H04L 12/40*     (2006.01)

(52) U.S. Cl.
     CPC ...... *G07C 5/0816* (2013.01); *H04L 12/40169* (2013.01); *H04L 2012/40215* (2013.01); *H04L 2012/40273* (2013.01)

(58) Field of Classification Search
     CPC ....... H04L 12/40; G07C 5/008; G07C 5/0808; G07C 5/0816; G07C 5/085; B60R 16/0315; B60R 25/24; G06F 2201/83; G06F 11/3013; G06F 11/3079; G06F 17/40; G06F 21/552; H04W 4/44; H04W 12/12
     See application file for complete search history.

(56) References Cited

U.S. PATENT DOCUMENTS

| | | | |
|---|---|---|---|
| 2011/0099623 A1* | 4/2011 | Garrard | H04L 63/02 726/14 |
| 2015/0358351 A1 | 12/2015 | Otsuka et al. | |
| 2018/0131712 A1* | 5/2018 | Cornelio | H04L 63/14 |
| 2018/0295147 A1 | 10/2018 | Haga et al. | |
| 2018/0316584 A1* | 11/2018 | Ujiie | H04W 12/61 |
| 2019/0007234 A1* | 1/2019 | Takada | H04L 12/40 |
| 2019/0026103 A1* | 1/2019 | Van Der Maas | G06F 11/0784 |
| 2019/0303567 A1* | 10/2019 | Batmaz | G06F 21/85 |
| 2021/0306361 A1* | 9/2021 | Tanaka | H04L 63/1416 |

FOREIGN PATENT DOCUMENTS

| | | | | |
|---|---|---|---|---|
| JP | 2012-079044 | | 4/2012 | |
| JP | 2014-146868 | | 8/2014 | |
| JP | 2017-111796 | | 6/2017 | |
| JP | 2017111796 A | * | 6/2017 | .......... G07C 5/0808 |
| JP | 2017-144852 | | 8/2017 | |

OTHER PUBLICATIONS

Dec. 17, 2021 Extended European Search Report for corresponding European patent application No. 19891092.9.
Shruti Sanadhya et al. article entitled "Asymmetric Caching: Improved Network Deduplication for Mobile Devices," published in Mobile Computing and Networking, ACM, 2 Penn Plaza, Suite 701, New York NY 10121-0701 USA, published on Aug. 22, 2012, pp. 161-172, XP058009212, DOI: 10.1145/2348543.2348565; ISBN: 978-1-4503-1159-5.
Official Communication issued in International Patent Application No. PCT/JP2019/035423, dated November 26, 2019, along with an English translation thereof.

* cited by examiner

FIG. 4

| TIME | ID | DATA (HEXADECIMAL FORMAT) | | | | | | | |
|---|---|---|---|---|---|---|---|---|---|
| | | 1ST BYTE | 2ND BYTE | 3RD BYTE | 4TH BYTE | 5TH BYTE | 6TH BYTE | 7TH BYTE | 8TH BYTE |
| 10:10:10 | ID1 | 01 | 50 | 40 | 30 | 30 | 30 | 30 | 30 |
| 10:10:20 | ID2 | 01 | A1 | 20 | 00 | 01 | 00 | 00 | 00 |
| 10:10:30 | ID3 | 01 | B1 | 7E | 20 | 00 | 00 | 00 | 00 |
| 10:10:40 | ID4 | 01 | 10 | 10 | 00 | 00 | 00 | 00 | 00 |
| 10:20:10 | ID1 | 02 | 50 | 40 | 30 | 30 | 30 | 30 | 30 |
| 10:20:20 | ID2 | 02 | A2 | 20 | 10 | 01 | 00 | 00 | 00 |
| 10:20:30 | ID3 | 02 | B2 | 7E | 30 | 00 | 00 | 00 | 00 |
| 10:20:40 | ID4 | 02 | 10 | 11 | 00 | 00 | 00 | 00 | 00 |
| ⋮ | ⋮ | | | | | | | ⋮ | |
| 10:50:10 | ID1 | 05 | 50 | 40 | 30 | 30 | 30 | 30 | 30 |
| 10:50:20 | ID2 | 05 | A5 | 20 | 20 | 01 | 00 | 00 | 00 |
| 10:50:30 | ID3 | 05 | B5 | 7E | 10 | 00 | 00 | 00 | 00 |
| 10:50:40 | ID4 | 05 | 10 | 15 | 00 | 00 | 00 | 00 | 00 |

FIG. 5

| ID | DATA | | | | | | | |
|---|---|---|---|---|---|---|---|---|
| | 1ST BYTE | 2ND BYTE | 3RD BYTE | 4TH BYTE | 5TH BYTE | 6TH BYTE | 7TH BYTE | 8TH BYTE |
| ID1 | COUNTER | VEHICLE NO. | VEHICLE NO. | VEHICLE NO. | VEHICLE NO. | VEHICLE NO. | VEHICLE NO. | VEHICLE NO. |
| ID2 | COUNTER | CHECKSUM | SPEED | SPEED | SHIFT | UNUSED | UNUSED | UNUSED |
| ID3 | COUNTER | CHECKSUM | STEERING ANGLE | STEERING ANGLE | UNUSED | UNUSED | UNUSED | UNUSED |
| ID4 | COUNTER | LOCATION INFORMATION | LOCATION INFORMATION | UNUSED | UNUSED | UNUSED | UNUSED | UNUSED |

VEHICLE NO.         : 7 BYTES; FIXED VALUE FOR EACH VEHICLE
SPEED               : 2 BYTES; FROM 0000 TO FFFF
STEERING ANGLE      : 2 BYTES; FROM 0000 TO FFFF
LOCATION INFORMATION: 2 BYTES; FROM 0000 TO FFFF
SHIFT               : 00: PARKING; 01: DRIVE
CHECKSUM            : FROM 00 TO FF
COUNTER             : FROM 00 TO FF

FIG. 6

| PROCESSING ITEM | PROCESSING Y/N | VALUE BEFORE PROCESSING | VALUE AFTER PROCESSING |
|---|---|---|---|
| DIVISION | YES | ID1 | DIVISION NO.1 |
| | | ID2 | DIVISION NO.2 |
| | | ID3 | DIVISION NO.3 |
| | | ID4 | DIVISION NO.4 |
| TIME INDEX | YES | ID1 INITIAL TIME (10:10:10) | T11 |
| | | ID2 INITIAL TIME (10:10:20) | T12 |
| | | ID3 INITIAL TIME (10:10:30) | T13 |
| | | ID4 INITIAL TIME (10:10:40) | T14 |
| | | ID1 SECOND TIME (10:20:10) | T21 |
| | | ID2 SECOND TIME (10:20:20) | T22 |
| | | ID3 SECOND TIME (10:20:30) | T23 |
| | | ID4 SECOND TIME (10:20:40) | T24 |
| | | ... | ... |
| | | ID1 FIFTH TIME (10:50:10) | T51 |
| | | ID2 FIFTH TIME (10:50:20) | T52 |
| | | ID3 FIFTH TIME (10:50:30) | T53 |
| | | ID4 FIFTH TIME (10:50:40) | T54 |
| SORTING (ASC. ORDER) | YES | - | - |
| DATA CONVERSION | YES | COUNTER | 00 |
| | | CHECKSUM | 00 |

FIG. 7

| DIVISION NO. | TIME | ID | DATA (HEXADECIMAL FORMAT) | | | | | | | |
|---|---|---|---|---|---|---|---|---|---|---|
| | | | 1ST BYTE | 2ND BYTE | 3RD BYTE | 4TH BYTE | 5TH BYTE | 6TH BYTE | 7TH BYTE | 8TH BYTE |
| 1 | T11 | ID1 | 00 | 50 | 40 | 30 | 30 | 30 | 30 | 30 |
| | T21 | ID1 | 00 | 50 | 40 | 30 | 30 | 30 | 30 | 30 |
| | ⋮ | ⋮ | ⋮ | ⋮ | ⋮ | ⋮ | ⋮ | ⋮ | ⋮ | ⋮ |
| | T51 | ID1 | 00 | 50 | 40 | 30 | 30 | 30 | 30 | 30 |
| 2 | T12 | ID2 | 00 | 00 | 20 | 00 | 01 | 00 | 00 | 00 |
| | T22 | ID2 | 00 | 00 | 20 | 10 | 01 | 00 | 00 | 00 |
| | ⋮ | ⋮ | ⋮ | ⋮ | ⋮ | ⋮ | ⋮ | ⋮ | ⋮ | ⋮ |
| | T52 | ID2 | 00 | 00 | 20 | 20 | 01 | 00 | 00 | 00 |
| 3 | T13 | ID3 | 00 | 00 | 7E | 10 | 00 | 00 | 00 | 00 |
| | T23 | ID3 | 00 | 00 | 7E | 20 | 00 | 00 | 00 | 00 |
| | ⋮ | ⋮ | ⋮ | ⋮ | ⋮ | ⋮ | ⋮ | ⋮ | ⋮ | ⋮ |
| | T53 | ID3 | 00 | 00 | 7E | 30 | 00 | 00 | 00 | 00 |
| 4 | T14 | ID4 | 00 | 10 | 10 | 00 | 00 | 00 | 00 | 00 |
| | T24 | ID4 | 00 | 10 | 11 | 00 | 00 | 00 | 00 | 00 |
| | ⋮ | ⋮ | ⋮ | ⋮ | ⋮ | ⋮ | ⋮ | ⋮ | ⋮ | ⋮ |
| | T54 | ID4 | 00 | 10 | 15 | 00 | 00 | 00 | 00 | 00 |

FIG. 8

| DIVISION NO. | IDENTIFIER |
|---|---|
| 1 | 11223344 |
| 2 | 55667788 |
| 3 | 99AABBCC |

FIG.9

| NO. | IDENTIFIER |
|---|---|
| 1 | 11223344 |
| 2 | 99AABBCC |
| 3 | DDEEFF00 |
|  | ... |
| 4 | AAAAAAAA |
| 5 | BBBBBBBB |
| 6 | CCCCCCCC |

FIG. 10

| NUMBER | IDENTIFIER | FILE PATH | ANOMALY Y/N |
|---|---|---|---|
| 1 | 11223344 | /log/20180101A.log | N |
| 2 | 99AABBCC | /log/20180101B.log | Y |
| 3 | DDEEFF00 | /log/20180101C.log | N |
| ... | ... | ... | ... |
| 4 | AAAAAAA | /log/20180201D.log | N |
| 5 | BBBBBBB | /log/20180301E.log | N |
| 6 | CCCCCCC | /log/20180401F.log | Y |

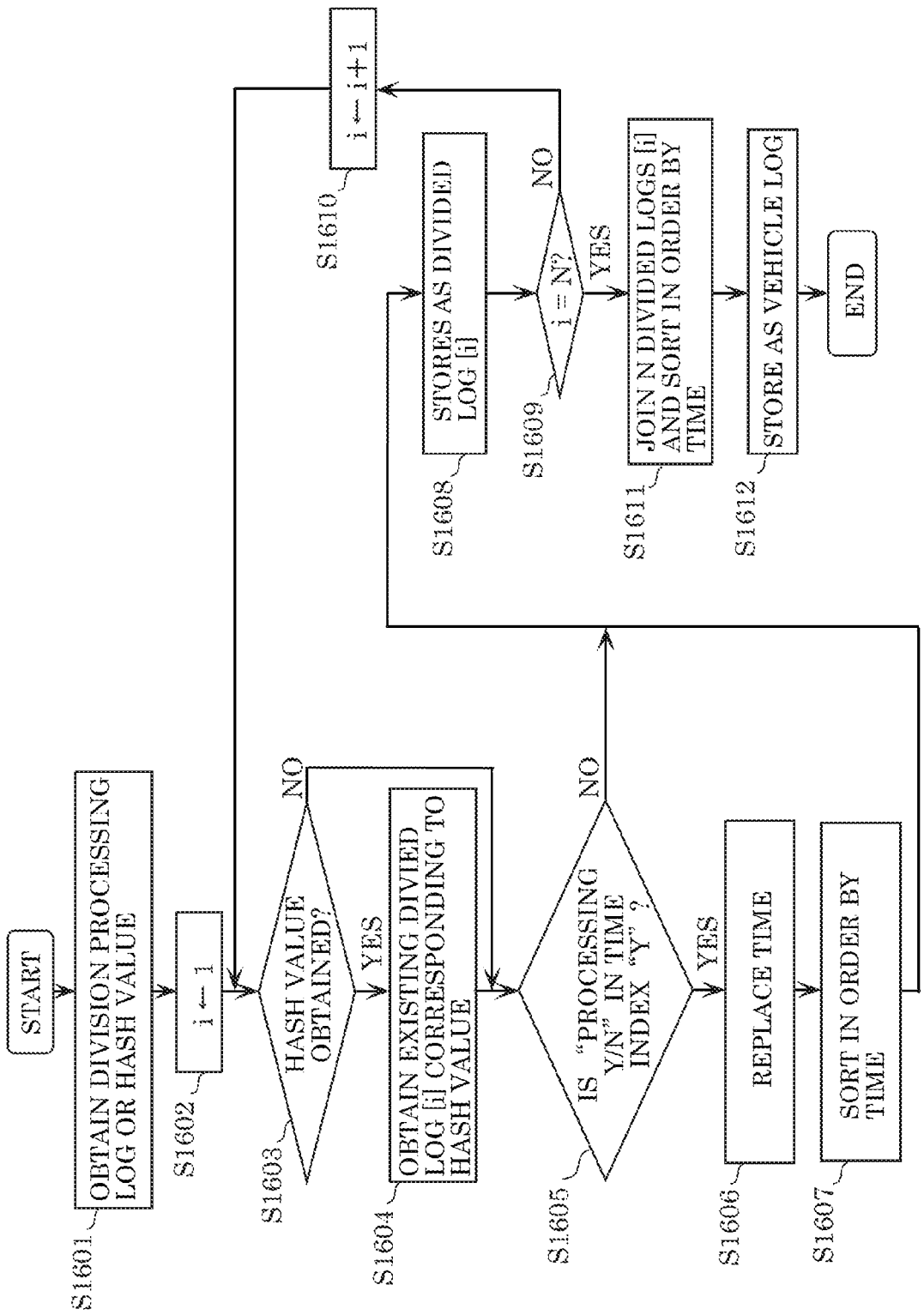

VEHICLE LOG TRANSMISSION DEVICE, VEHICLE LOG ANALYSIS SERVER, VEHICLE LOG ANALYSIS SYSTEM, AND VEHICLE LOG TRANSMISSION/RECEPTION METHOD

CROSS REFERENCE TO RELATED APPLICATIONS

This application is a U.S. continuation application of PCT International Patent Application Number PCT/JP2019/035423 filed on Sep. 9, 2019, claiming the benefit of priority of Japanese Patent Application Number 2018-224503 filed on Nov. 30, 2018, the entire contents of which are hereby incorporated by reference.

BACKGROUND

1. Technical Field

The present disclosure relates to a vehicle log transmission device, a vehicle log analysis server, a vehicle log analysis system, and a vehicle log transmission/reception method.

2. Description of the Related Art

Recently, many devices called Electronic Control Units (ECUs) are being provided in systems installed in automobiles. A network which connects these ECUs is called an "in-vehicle network". There are many in-vehicle network standards. The standard known as CAN (Controller Area Network), defined by ISO 11898-1, is the most mainstream standard for in-vehicle networks.

In a CAN, a communication path is constituted by two buses, and ECUs connected to the buses are called "nodes". Each node connected to a bus transmits and receives messages called "frames". CAN does not have identifiers indicating transmission destination nodes or transmission source nodes. Instead, a transmitting node adds an ID called a "message ID" to each frame before transmitting the frame, and each receiving node receives only frames which have a predetermined message ID.

As such, there is a threat in that the unauthorized control of an automobile can be achieved by connecting an ECU to a CAN bus and transmitting frames including anomalous control commands by impersonating a legitimate ECU.

In light of this threat, the method disclosed in Japanese Unexamined Patent Application Publication No. 2014-146868 (Patent Literature 1 (PTL 1)) can be given as an example of a method for detecting unauthorized data, i.e., the infiltration of anomalous control commands, in an in-vehicle network.

However, when a server system outside a vehicle monitors data in an in-vehicle network system, a large amount of data may be transmitted from the in-vehicle network system to the external server system. It is not easy to prepare the resources required to process such a large amount of data.

Patent Japanese Unexamined Patent Application Publication No. 2012-79044 (Literature 2 (PTL 2)) discloses a method that reduces the amount of data communicated by dividing a large amount of data into pieces of data of a predetermined size, comparing each instance of the divided data with data stored in a server, and when the data matches, only a hash value of the divided data is transmitted, whereas when the data does not match, the divided data is transmitted to the server.

SUMMARY

However, in-vehicle network logs include data which fluctuates depending on the travel conditions of the automobile, as well as time data, and thus with the method of dividing the data into a predetermined size described in the related art, the likelihood that divided data in a log currently obtained matches divided data in logs obtained in the past and stored in the server is low. There is thus a problem in that it is necessary to transmit much of the divided data to the server, which makes it difficult to significantly reduce the amount of data communicated as compared to a situation where the log is transmitted in an undivided state.

Accordingly, the present disclosure provides a vehicle log transmission device and the like capable of effectively reducing an amount of data communicated for a vehicle log transmitted from a vehicle to a server outside the vehicle.

To solve the above-described problem, a vehicle log transmission device according to the present disclosure is a vehicle log transmission device that transmits, to a vehicle log analysis server, a vehicle log including a plurality of pieces of data respectively associated with IDs indicating a data type, the vehicle log transmission device including: a vehicle log obtainer that obtains the vehicle log; a vehicle log division processor that generates one or more divided logs by dividing the obtained vehicle log using the IDs included in the vehicle log; existing identifier storage that stores an existing identifier list, the existing identifier list being a list of identifiers corresponding to existing divided logs generated by dividing an existing vehicle log shared between the vehicle log transmission device and the vehicle log analysis server using IDs included in the existing vehicle log; a vehicle log transmission necessity determiner that generates an identifier for each of the one or more divided logs, and of the generated identifiers, determines that a divided log corresponding to an identifier present in the existing identifier list is a first divided log, and determines that a divided log corresponding to an identifier not present in the existing identifier list is a second divided log; and a vehicle-side communicator that transmits the identifier corresponding to the first divided log to the vehicle log analysis server, and transmits the second divided log to the vehicle log analysis server.

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, and recording media.

A vehicle log transmission device and the like according to an aspect of the present disclosure can effectively reduce an amount of data communicated for a vehicle log transmitted between a vehicle and a server outside the vehicle. As a result, a vehicle log can be transmitted to an external server without preparing resources which enable large vehicle logs to be communicated. This makes it possible to detect the unauthorized data infiltrating the vehicle network using a server outside the vehicle, and therefore contribute to vehicle safety.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating an example of a vehicle log according to Embodiment 1 of the present disclosure;

FIG. 5 is a diagram illustrating an example of a vehicle log definition table according to Embodiment 1 of the present disclosure;

FIG. 6 is a diagram illustrating an example of vehicle log division processing rules according to Embodiment 1 of the present disclosure;

FIG. 7 is a diagram illustrating an example of a division processing log according to Embodiment 1 of the present disclosure;

FIG. 8 is a diagram illustrating an example of an identifier of the division processing log according to Embodiment 1 of the present disclosure;

FIG. 9 is a diagram illustrating an example of an existing identifier list according to Embodiment 1 of the present disclosure;

FIG. 10 is a diagram illustrating an example of an existing divided log list according to Embodiment 1 of the present disclosure;

FIG. 16 is a flowchart illustrating vehicle log restoration processing according to Embodiment 1 of the present disclosure.

DETAILED DESCRIPTION OF THE EMBODIMENTS

Figure 1:
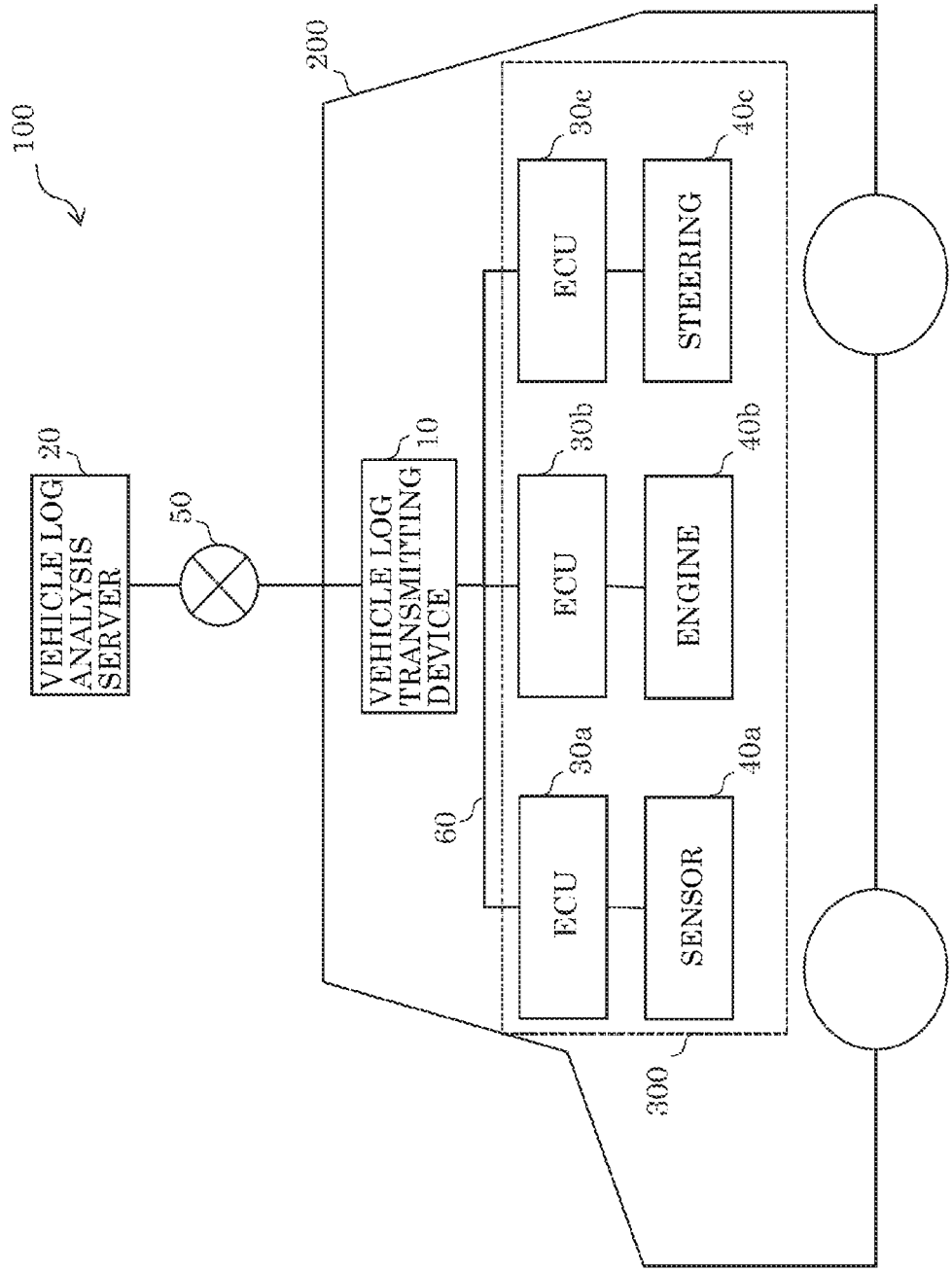
FIG. 1 is an overall schematic diagram illustrating a vehicle log analysis system according to Embodiment 1 of the present disclosure.

A vehicle log transmitting device according to the present disclosure is a vehicle log transmission device that transmits, to a vehicle log analysis server, a vehicle log including a plurality of pieces of data respectively associated with IDs indicating a data type, the vehicle log transmission device including: a vehicle log obtainer that obtains the vehicle log; a vehicle log division processor that generates one or more divided logs by dividing the obtained vehicle log using the IDs included in the vehicle log; existing identifier storage that stores an existing identifier list, the existing identifier list being a list of identifiers corresponding to existing divided logs generated by dividing an existing vehicle log shared between the vehicle log transmission device and the vehicle log analysis server using IDs included in the existing vehicle log; a vehicle log transmission necessity determiner that generates an identifier for each of the one or more divided logs, and of the generated identifiers, determines that a divided log corresponding to an identifier present in the existing identifier list is a first divided log, and determines that a divided log corresponding to an identifier not present in the existing identifier list is a second divided log; and a vehicle-side communicator that transmits the identifier corresponding to the first divided log to the vehicle log analysis server, and transmits the second divided log to the vehicle log analysis server.

Through this, when, in a vehicle log, IDs are associated with data such as a result of a specific system operation, a result of transmitting a specific message, or the like, dividing the vehicle log using the IDs makes it possible to divide the vehicle log in accordance with the type of the data, which in turn makes it more likely that the divided logs will match existing divided logs than when the data is simply divided according to the data size regardless of the data type. Accordingly, there will be more identifiers corresponding to the first divided log, which matches an identifier corresponding to an existing divided log, making it less likely that the second divided log will be transmitted, and more likely that the identifier corresponding to the first divided log, which has a smaller data size, will be transmitted. Accordingly, the amount of data communicated for a vehicle log transmitted from a vehicle to a server outside the vehicle (a vehicle log analysis server) can be effectively reduced.

Additionally, the vehicle log division processor may generate the one or more divided logs by dividing the obtained vehicle log at each of the IDs included in the vehicle log, and the existing identifier storage may store the existing identifier list, the existing identifier list being a list corresponding to the existing divided logs generated by dividing the existing vehicle log at each of the IDs included in the existing vehicle log.

Through this, by dividing the vehicle log at each of the IDs, the vehicle log can be divided by each data type, which further increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log may include a plurality of pieces of data arranged in such a manner that a plurality of the IDs starting with a predetermined ID repeat in a cyclical manner; the vehicle log division processor may generate the one or more divided logs by dividing the obtained vehicle log at each of the plurality of the IDs, starting with the predetermined ID, included in the vehicle log; and the existing identifier storage may store the existing identifier list, the existing identifier list being a list of identifiers corresponding to the existing divided logs generated by dividing the existing vehicle log at each of the plurality of the IDs included in the existing vehicle log, starting with the predetermined ID.

Through this, when, in a vehicle log, data such as a result of a specific system operation for each of IDs, a result of transmitting a specific message for each of IDs, or the like is arranged in such a manner that a plurality of IDs starting with a predetermined ID repeat in a cyclical manner, dividing the vehicle log so that each of the divided logs starts with the predetermined ID makes it more likely that the one cycle of IDs included in the divided log and the one cycle of IDs included in the existing divided log will match. Accordingly, the likelihood that the divided log and the existing divided log will match becomes even higher, and there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log may include the plurality of pieces of data, each associated with time information; the vehicle log division processor may further perform processing for replacing time information included in each of the one or more divided logs with time index information; the existing identifier storage may further store the existing identifier list, the existing identifier list being a list of identifiers corresponding to the existing divided logs in each of which time information has been replaced with time index information; and the vehicle-side communicator may further transmit, to the vehicle log analysis server, a time list expressing a correspondence relationship between the time information and the time index information.

The time information is information that reliably is different between the divided log and the existing divided log, and is therefore information which can prevent the divided log and the existing divided log from matching. However, by replacing the time information in the divided log and the existing divided log with time index information, the time information can be excluded from the determination as to whether the divided log and the existing divided log match, and the likelihood that the divided log and the existing divided log will match becomes even higher. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log division processor may further perform processing that sorts the one or more divided logs in accordance with a magnitude of values of the IDs or values of the data included in the one or more divided logs; and the existing identifier storage may further store the existing identifier list, the existing identifier list being a list of identifiers corresponding to the existing divided logs sorted by the magnitude of the value of the IDs or the value of the data.

Through this, when data having variable values is included in the divided log and the existing divided log, sorting the divided log and the existing divided log in order from the largest or smallest of the values in the variable value data increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log division processor may further perform replacement processing for replacing values of the data included in the one or more divided logs with a predetermined value or rounding processing that rounds the value of the data; and the existing identifier storage may further store the existing identifier list, the existing identifier list being a list of identifiers corresponding to the existing divided logs which have been subjected to the replacement processing or the rounding processing.

Through this, data unrelated to the control of the vehicle, such as data which fluctuates in accordance with operation times, operation frequencies, and so on of specific functions of the vehicle, such as counters and checksums, as well as detailed values from sensors or the like, can be excluded from the determination as to whether the divided log and the existing divided log match, which further increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log transmission device may further include an existing identifier registrar that registers, in the existing identifier list, an identifier corresponding to a divided log determined to be the second divided log by the vehicle log transmission necessity determiner.

Through this, it is no longer necessary to share the divided log between the vehicle log transmission device and the vehicle log analysis server in advance, which makes it possible to reduce development costs by the amount saved by not constructing the existing divided log in advance. Additionally, as vehicle logs are collected in the vehicle log analysis server, the number of types of existing divided logs increases, and the likelihood that the divided log and the existing divided log will match increases as well. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, a vehicle log analysis server according to the present disclosure is a vehicle log analysis server that receives, from a vehicle log transmission device, a vehicle log including a plurality of pieces of data respectively associated with IDs indicating a data type, the vehicle log analysis server including: a server-side communicator that receives, from the vehicle log transmission device, an identifier corresponding to a first divided log among one or more divided logs generated by dividing the vehicle log using IDs included in the vehicle log, and a second divided log, among the one or more divided logs, that is not the first divided log; existing divided log storage that stores an existing divided log list, the existing divided log list being a list of existing divided logs generated by dividing an existing vehicle log shared between the vehicle log transmission device and the vehicle log analysis server using IDs included in the existing vehicle log and identifiers corresponding to the existing divided logs; a vehicle log restorer that restores the vehicle log by referring to the existing divided log list when the identifier corresponding to the first divided log is received, obtaining the existing divided log corresponding to the identifier in the existing divided log list, and joining the second divided log with the existing divided log; and vehicle log storage that stores the restored vehicle log.

Through this, when, in a vehicle log, IDs are associated with data such as a result of a specific system operation, a result of transmitting a specific message, or the like, dividing the vehicle log using the IDs makes it possible to divide the vehicle log in accordance with the type of the data, which in turn makes it more likely that the divided logs will match existing divided logs than when the data is simply divided according to the data size regardless of the data type. Accordingly, there will be more identifiers corresponding to the first divided log, which matches an identifier corresponding to an existing divided log, making it less likely that the second divided log will be transmitted, and more likely that the identifier corresponding to the first divided log, which has a smaller data size, will be transmitted. Accordingly, the amount of data communicated for a vehicle log transmitted from a vehicle to a server outside the vehicle can be effectively reduced.

Additionally, the server-side communicator may receive, from the vehicle log transmission device, an identifier corresponding to the first divided log among the one or more divided logs generated by dividing the vehicle log at each of the IDs included in the vehicle log, and the second divided log among the one or more divided logs; and the existing divided log storage may store the existing divided log list, the existing divided log list being a list of the existing divided logs generated by dividing the existing vehicle log at each of the IDs included in the existing vehicle log and identifiers corresponding to the existing divided logs.

Through this, by dividing the vehicle log at each of the IDs, the vehicle log can be divided by each data type, which further increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log may include a plurality of pieces of data arranged in such a manner that a plurality of the IDs starting with a predetermined ID repeat in a cyclical manner; the server-side communicator may receive, from the vehicle log transmission device, an identifier corresponding to the first divided log among the one or more divided logs generated by dividing the vehicle log at each of the plurality of the IDs, starting with the predetermined ID, included in the vehicle log, and the second divided log among the one or more divided logs; and the existing divided log storage may store the existing divided log list, the existing divided log list being a list of the existing divided logs generated by dividing the existing vehicle log at each of the plurality of the IDs, starting with the predetermined ID, included in the existing vehicle log and identifiers corresponding to the existing divided logs.

Through this, when, in a vehicle log, data such as a result of a specific system operation for each of IDs, a result of transmitting a specific message for each of IDs, or the like is arranged in a manner such that a plurality of IDs starting with a predetermined ID repeat in a cyclical manner, dividing the vehicle log so that each of the divided logs starts with the predetermined ID ensures that the one cycle of IDs included in the divided log and the one cycle of IDs included in the existing divided log will match. Accordingly, the likelihood that the divided log and the existing divided log will match becomes even higher, and there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log analysis server may further include: an anomalous log detector that monitors the restored vehicle log and detects a case where the restored vehicle log contains evidence of an attack as an anomaly; and an anomaly notifier that notifies a predetermined notification target that there is an anomaly in the vehicle.

Through this, when an anomaly in terms of security has been detected from a restored vehicle log, the vehicle can notify a predetermined notification target of the anomaly.

Additionally, the anomalous log detector may further: hold an anomalous identifier list, the anomalous identifier list being a list of identifiers corresponding to anomalous divided logs generated by dividing a vehicle log previously determined to be anomalous using IDs included in the vehicle log; when the server-side communicator receives an identifier corresponding to the first divided log, detect an anomaly when the identifier is included in the anomalous identifier list; when the server-side communicator has received the second divided log, detect the second divided log as an anomalous log when the second divided log contains evidence of an attack; and register an anomalous divided log generated by dividing the anomalous log using IDs included in the anomalous log in the anomalous identifier list.

Through this, by storing the identifier of an anomalous divided log, an anomaly can be detected using only the identifier of the anomalous log, without needing to completely restore the vehicle log. This shortens the time it takes to detect an anomaly after receiving the vehicle log, and the anomaly can therefore be handled quickly.

Additionally, the vehicle log may include the plurality of pieces of data, each associated with time information; the server-side communicator may receive, from the vehicle log transmission device, an identifier corresponding to the first divided log among the one or more divided logs in which time information has been replaced with time index information, the second divided log among the one or more divided logs, and a time list expressing a correspondence relationship between the time information and the time index information; the existing divided log storage may further store the existing divided log list, the existing divided log list being a list of the existing divided logs in which the time information has been replaced with the time index information and identifiers corresponding to the existing divided logs; and the vehicle log restorer may restore the vehicle log by referring to the existing divided log list when the identifier corresponding to the first divided log is received, obtaining the existing divided log corresponding to the identifier in the existing divided log list, referring to the time list and replacing the time index information included in the existing divided log with time information, and joining the second divided log with the existing divided log.

The time information is information that reliably is different between the divided log and the existing divided log, and is therefore information which can prevent the divided log and the existing divided log from matching.

However, by replacing the time information in the divided log and the existing divided log with time index information, the time information can be excluded from the determination as to whether the divided log and the existing divided log match, and the likelihood that the divided log and the existing divided log will match becomes even higher. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the server-side communicator may receive an identifier corresponding to the first divided log among the one or more divided logs sorted by a magnitude of a value of an ID or a value of data, and the second divided log among the one or more divided logs; the existing divided log storage may further store the existing divided log list, the existing divided log list being a list of the existing divided logs sorted by the magnitude of the value of the IDs or the value of the data, and the identifiers corresponding to the existing divided logs; and the vehicle log restorer may restore the vehicle log by referring to the existing divided log list when the identifier corresponding to the first divided log is received, obtaining the existing divided log corresponding to the identifier in the existing divided log list, referring to the time list and replacing the time index information in the existing divided log with time information, referring to the replaced time information and sorting the existing divided logs in order from the earliest time, and joining the second divided log with the existing divided log.

Through this, when data having variable values is included in the divided log and the existing divided log, sorting the divided log and the existing divided log in order from the largest or smallest of the values in the variable value data increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the server-side communicator may receive an identifier corresponding to the first divided log among the one or more divided logs subjected to replacement processing for replacing a value of data with a predetermined value or rounding processing that rounds the value of the data, and the second divided log among the one or more divided logs; and the existing divided log storage may further store the existing divided log list, the existing divided log list being a list of the existing divided logs subjected to the replacement processing or the rounding processing, and identifiers corresponding to the existing divided logs.

Through this, data unrelated to the control of the vehicle, such as data which fluctuates in accordance with operation times, operation frequencies, and so on of specific functions of the vehicle, such as counters and checksums, as well as detailed values from sensors or the like, can be excluded from the determination as to whether the divided log and the existing divided log match, which further increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log analysis server may further include an existing divided log registrar that, when the second divided log is received, generates an identifier corresponding to the second divided log, and registers the second divided log and the identifier in the existing divided log list.

Through this, it is no longer necessary to share the divided log between the vehicle log transmission device and the vehicle log analysis server in advance, which makes it possible to reduce development costs by the amount saved by not constructing the existing divided log in advance. Additionally, as vehicle logs are collected in the vehicle log analysis server, the number of types of existing divided logs increases, and the likelihood that the divided log and the existing divided log will match increases as well. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, a vehicle log analysis system includes a vehicle log transmission device and a vehicle log analysis server. The vehicle log analysis system transmits a vehicle log including a plurality of pieces of data respectively associated with IDs indicating a data type from the vehicle log transmission device to the vehicle log analysis server. The vehicle log transmission device includes: a vehicle log obtainer that obtains the vehicle log; a vehicle log division processor that generates one or more divided logs by dividing the obtained vehicle log using the IDs included in the vehicle log; existing identifier storage that stores an existing identifier list, the existing identifier list being a list of identifiers corresponding to existing divided logs generated by dividing an existing vehicle log shared between the vehicle log transmission device and the vehicle log analysis server using IDs included in the existing vehicle log; a vehicle log transmission necessity determiner that generates an identifier for each of the one or more divided logs, and of the generated identifiers, determines that a divided log corresponding to an identifier present in the existing identifier list is a first divided log, and determines that a divided log corresponding to an identifier not present in the existing identifier list is a second divided log; and a vehicle-side communicator that transmits the identifier corresponding to the first divided log to the vehicle log analysis server, and transmits the second divided log to the vehicle log analysis server. The vehicle log analysis server includes: a server-side communicator that receives an identifier corresponding to the first divided log and the second divided log transmitted from the vehicle-side communicator; existing divided log storage that stores an existing divided log list, the existing divided log list being a list of identifiers corresponding to the existing divided logs; a vehicle log restorer that restores the vehicle log by referring to the existing divided log list when the identifier corresponding to the first divided log is received, obtaining the existing divided log corresponding to the identifier in the existing divided log list, and joining the second divided log with the existing divided log; and vehicle log storage that stores the restored vehicle log.

Through this, when, in a vehicle log, IDs are associated with data such as a result of a specific system operation, a result of transmitting a specific message, or the like, dividing the vehicle log using the IDs makes it possible to divide the vehicle log in accordance with the type of the data, which in turn makes it more likely that the divided logs will match existing divided logs than when the data is simply divided according to the data size regardless of the data type. Accordingly, there will be more identifiers corresponding to the first divided log, which matches an identifier corresponding to an existing divided log, making it less likely that the second divided log will be transmitted, and more likely that the identifier corresponding to the first divided log, which has a smaller data size, will be transmitted. Accordingly, the amount of data communicated for a vehicle log transmitted from a vehicle to a server outside the vehicle can be effectively reduced.

Additionally, the vehicle log division processor may generate the one or more divided logs by dividing the obtained vehicle log at each of the IDs included in the vehicle log; the existing identifier storage may store the existing identifier list, the existing identifier list being a list corresponding to the existing divided logs generated by dividing the existing vehicle log at each of the IDs included in the existing vehicle log; the server-side communicator may receive an identifier corresponding to the first divided log among the one or more divided logs, and the second divided log among the one or more divided logs, transmitted from the vehicle-side communicator; and the existing divided log storage may store the existing divided log list, the existing divided log list being a list of the existing divided logs generated by dividing the existing vehicle log at each of the IDs included in the existing vehicle log and identifiers corresponding to the existing divided logs.

Through this, by dividing the vehicle log at each of the IDs, the vehicle log can be divided by each data type, which further increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log may include a plurality of pieces of data arranged in such a manner that a plurality of the IDs starting with a predetermined ID repeat in a cyclical manner; the vehicle log division processor may generate the one or more divided logs by dividing the obtained vehicle log at each of the plurality of the IDs, starting with the predetermined ID, included in the vehicle log; the existing identifier storage may store the existing identifier list, the existing identifier list being a list of identifiers corresponding to the existing divided logs generated by dividing the existing vehicle log at each of the plurality of the IDs, starting with the predetermined ID, included in the existing vehicle log; the server-side communicator may receive an identifier corresponding to the first divided log among the one or more divided logs, and the second divided log among the one or more divided logs, transmitted from the vehicle-side communicator; and the existing identifier storage may store the existing divided log list, the existing divided log list being a list of the existing divided logs generated by dividing the existing vehicle log at each of the IDs included in the existing vehicle log and identifiers corresponding to the existing divided logs.

Through this, when, in a vehicle log, data such as a result of a specific system operation for each of IDs, a result of transmitting a specific message for each of IDs, or the like is arranged so that when a plurality of IDs starting with a predetermined ID are taken as a single cycle, the plurality of IDs repeat in a cyclical manner, dividing the vehicle log so that each of the divided logs starts with the predetermined ID ensures that the one cycle of IDs included in the divided log and the one cycle of IDs included in the existing divided log will match. Accordingly, the likelihood that the divided log and the existing divided log will match becomes even higher, and there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log may include the plurality of pieces of data, each associated with time information; the vehicle log division processor may further perform processing for replacing time information included in the one or more divided logs with time index information; the existing identifier storage may further store the existing identifier list, the existing identifier list being a list of identifiers corresponding to the existing divided logs in which time information has been replaced with time index information; the vehicle-side communicator may further transmit, to the vehicle log analysis server, a time list expressing a correspondence relationship between the time information and the time index information; the server-side communicator may further receive the time list from the vehicle-side communicator; the existing divided log storage may further store the existing divided log list, the existing divided log list being a list of the existing divided logs in which the time information has been replaced with the time index information and identifiers corresponding to the existing divided logs; and the vehicle log restorer may restore the vehicle log by referring to the existing divided log list when the identifier corresponding to the first divided log is received, obtaining the existing divided log corresponding to the identifier in the existing divided log list, referring to the time list and replacing the time index information included in the existing divided log with time information, and joining the second divided log with the existing divided log.

The time information is information that reliably is different between the divided log and the existing divided log, and is therefore information which can prevent the divided log and the existing divided log from matching. However, by replacing the time information in the divided log and the existing divided log with time index information, the time information can be excluded from the determination as to whether the divided log and the existing divided log match, and the likelihood that the divided log and the existing divided log will match becomes even higher. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log division processor may perform processing that sorts the one or more divided logs in accordance with a magnitude of values of the IDs or values of the data included in the one or more divided logs; the existing identifier storage may further store the existing identifier list, the existing identifier list being a list of identifiers corresponding to the existing divided logs sorted by the magnitude of the value of the IDs or the value of the data; the server-side communicator may receive an identifier corresponding to the first divided log among the one or more divided logs sorted by a magnitude of a value of an ID or a value of data, and the second divided log among the one or more divided logs; the existing divided log storage may further store the existing divided log list, the existing divided log list being a list of the existing divided logs sorted by the magnitude of the value of the IDs or the value of the data, and the identifiers corresponding to the existing divided logs; and the vehicle log restorer may restore the vehicle log by referring to the existing divided log list when the identifier corresponding to the first divided log is received, obtaining the existing divided log corresponding to the identifier in the existing divided log list, referring to the time list and replacing the time index information in the existing divided log with time information, referring to the replaced time information and sorting the existing divided logs in order from the earliest time, and joining the second divided log with the existing divided log.

Through this, when data having variable values is included in the divided log and the existing divided log, sorting the divided log and the existing divided log in order from the largest or smallest of the values in the variable value data increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log division processor may further perform replacement processing for replacing values of the data included in the one or more divided logs with a predetermined value or rounding processing that rounds the value of the data; the existing identifier storage may further store the existing identifier list, the existing identifier list being a list of identifiers corresponding to the existing divided logs which have been subjected to the replacement processing or the rounding processing; the server-side communicator may receive an identifier corresponding to the first divided log among the one or more divided logs subjected to the replacement processing or the rounding processing, and the second divided log among the one or more divided logs; and the existing divided log storage may further store the existing divided log list, the existing divided log list being a list of the existing divided logs subjected to the replacement processing or the rounding processing, and identifiers corresponding to the existing divided logs.

Through this, data unrelated to the control of the vehicle, such as data which fluctuates in accordance with operation times, operation frequencies, and so on of specific functions of the vehicle, such as counters and checksums, as well as detailed values from sensors or the like, can be excluded from the determination as to whether the divided log and the existing divided log match, which further increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log analysis server may further include: an anomalous log detector that monitors the restored vehicle log and detects a case where the restored vehicle log contains evidence of an attack as an anomaly; and an anomaly notifier that notifies a predetermined notification target that there is an anomaly in the vehicle.

Through this, when an anomaly in terms of security has been detected from a restored vehicle log, the vehicle can notify a predetermined notification target of the anomaly.

Additionally, the anomalous log detector may further: hold an anomalous identifier list, the anomalous identifier list being a list of identifiers corresponding to anomalous divided logs generated by dividing a vehicle log previously determined to be anomalous using IDs included in the vehicle log; when the server-side communicator has received an identifier corresponding to the first divided log, detect an anomaly when the identifier is included in the anomalous identifier list; when the server-side communicator has received the second divided log, detect the second divided log as an anomalous log when the second divided log contains evidence of an attack; and register an anomalous divided log generated by dividing the anomalous log using IDs included in the anomalous log in the anomalous identifier list.

Through this, by storing the identifier of an anomalous divided log, an anomaly can be detected using only the identifier of the anomalous log, without needing to completely restore the vehicle log. This shortens the time it takes to detect an anomaly after receiving the vehicle log, and the anomaly can therefore be handled quickly.

Additionally, the vehicle log transmission device may further include an existing identifier registrar that registers, in the existing identifier list, an identifier corresponding to a divided log determined to be the second divided log by the vehicle log transmission necessity determiner; and the vehicle log analysis server may further include an existing divided log registrar that, when the second divided log is received, generates an identifier corresponding to the second divided log, and registers the second divided log and the identifier in the existing divided log list.

Through this, it is no longer necessary to share the divided log between the vehicle log transmission device and the vehicle log analysis server in advance, which makes it possible to reduce development costs by the amount saved by not constructing the existing divided log in advance. Additionally, as vehicle logs are collected in the vehicle log analysis server, the number of types of existing divided logs increases, and the likelihood that the divided log and the existing divided log will match increases as well. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, the vehicle log obtainer may obtain, as the vehicle log, at least one of the following: an in-vehicle network log according to the CAN or CAN-FD protocol, the in-vehicle network log including a frame ID as the ID of the vehicle log; an in-vehicle network log according to the FlexRay (registered trademark) protocol, the in-vehicle network log including a slot ID as the ID of the vehicle log; an in-vehicle network log according to the Ethernet (registered trademark) protocol, the in-vehicle network log including an IP address as the ID of the vehicle log; and a system operation log including a process number as the ID of the vehicle log.

Through this, by collecting logs according to a specific protocol, the format of the vehicle logs can be unified, which increases the likelihood that the divided log and the existing divided log will match. Accordingly, there will be even more identifiers corresponding to the first divided log, which matches an identifier corresponding to an existing divided log, making it less likely that the second divided log will be transmitted, and more likely that the identifier corresponding to the first divided log will be transmitted. Accordingly, the amount of data communicated for a vehicle log transmitted from a vehicle to a server outside the vehicle can be more effectively reduced.

Additionally, a vehicle log transmission/reception method according to the present disclosure includes a vehicle log transmitting method performed by a vehicle log transmission device and a vehicle log receiving method performed by a vehicle log analysis server. The vehicle log transmission/reception method transmits a vehicle log including a plurality of pieces of data respectively associated with IDs indicating a data type from the vehicle log transmission device to the vehicle log analysis server. The vehicle log transmission device includes existing identifier storage that stores an existing identifier list, the existing identifier list being a list of identifiers corresponding to existing divided logs generated by dividing an existing vehicle log shared between the vehicle log transmission device and the vehicle log analysis server using IDs included in the existing vehicle log. The vehicle log analysis server includes existing divided log storage that stores an existing divided log list, the existing divided log list being a list of identifiers corresponding to the existing divided logs. The vehicle log transmitting method includes: obtaining the vehicle log; generating one or more divided logs by dividing the obtained vehicle log using the IDs included in the vehicle log; generating an identifier for each of the one or more divided logs, and of the generated identifiers, determining that a divided log corresponding to an identifier present in the existing identifier list is a first divided log, and determining that a divided log corresponding to an identifier not present in the existing identifier list is a second divided log; and transmitting the identifier corresponding to the first divided log to the vehicle log analysis server, and transmitting the second divided log to the vehicle log analysis server. The vehicle log receiving method includes: receiving an identifier corresponding to the first divided log and the second divided log transmitted in the transmitting; restoring the vehicle log by referring to the existing divided log list when the identifier corresponding to the first divided log is received, obtaining the existing divided log corresponding to the identifier in the existing divided log list, and joining the second divided log with the existing divided log; and storing the restored vehicle log.

Through this, when, in a vehicle log, IDs are associated with data such as a result of a specific system operation, a result of transmitting a specific message, or the like, dividing the vehicle log using the IDs makes it possible to divide the vehicle log in accordance with the type of the data, which in turn makes it more likely that the divided logs will match existing divided logs than when the data is simply divided according to the data size regardless of the data type. Accordingly, there will be more identifiers corresponding to the first divided log, which matches an identifier corresponding to an existing divided log, making it less likely that the second divided log will be transmitted, and more likely that the identifier corresponding to the first divided log, which has a smaller data size, will be transmitted. Accordingly, the amount of data communicated for a vehicle log transmitted from a vehicle to a server outside the vehicle can be effectively reduced.

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, or recording media.

A vehicle log transmission device, a vehicle log analysis server, a vehicle log analysis system, and a vehicle log transmission/reception method according to embodiments will be described hereinafter with reference to the drawings. Each of the following embodiments describes a specific example of the present disclosure. As such, the numerical values, constituent elements, arrangements and connection states of constituent elements, steps serving as elements of processing, orders of steps, and the like in the following embodiments are merely examples, and are not intended to limit the present disclosure. Additionally, of the constituent elements in the following embodiments, constituent elements not denoted in the independent claims are considered to be optional constituent elements. Additionally, the drawings are schematic diagrams, and are not necessarily exact illustrations.

Embodiment 1

Overall Configuration of Vehicle Log Analysis System

FIG. 1 is an overall schematic diagram illustrating vehicle log analysis system 100 according to Embodiment 1 of the present disclosure.

In FIG. 1, vehicle log analysis system 100 is constituted by vehicle log analysis server 20 and vehicle 200, and vehicle log analysis server 20 and vehicle 200 are connected over external network 50. External network 50 is the Internet, for example. A communication method of external network 50 may be wired or wireless. Additionally, the wireless communication method may be an existing technology such as Wi-Fi (registered trademark), 3G/LTE (Long Term Evolution), or the like.

Vehicle 200 includes vehicle log transmission device 10, ECU 30a, ECU 30b, ECU 30c, sensor 40a, engine 40b, and steering 40c.

Vehicle log transmission device 10 is connected to vehicle log analysis server 20 over external network 50.

In vehicle 200, vehicle log transmission device 10, ECU 30a, ECU 30b, and ECU 30c are connected to each other over vehicle network 60. Vehicle network 60 is a CAN, for example. Note that vehicle network 60 may use a communication protocol such as CAN-FD, FlexRay, Ethernet, or the like.

ECU 30a is connected to sensor 40a, ECU 30b is connected to engine 40b, and ECU 30c is connected to steering 40c.

ECUs 30*a*, 30*b*, and 30*c* obtain states of the devices to which those ECUs are respectively connected, and periodically send messages expressing the obtained states to vehicle network 60.

ECU 30*a* obtains sensor information measured by sensor 40*a*, which measures acceleration of vehicle 200, and sends a message including a data value expressing the sensor information to vehicle network 60.

ECU 30*b* obtains a rotation rate, which is one state of engine 40*b*, and sends a message including a data value expressing the rotation rate to vehicle network 60. ECU 30*b* also controls the rotation rate of engine 40*b* based on information pertaining to engine 40*b* obtained from vehicle network 60.

ECU 30*c* obtains a steering angle of steering 40*c*, and sends a message including a data value expressing the steering angle to vehicle network 60. ECU 30*c* also controls the steering angle of steering 40*c* based on information pertaining to steering 40*c* obtained from vehicle network 60.

Hereinafter, ECU 30*a*, ECU 30*b*, and ECU 30*c* connected to vehicle network 60, as well as sensor 40*a*, engine 40*b*, and steering 40*c*, will be collectively referred to as "vehicle system 300".

Vehicle log transmission device 10 obtains a vehicle log from ECUs 30*a*, 30*b*, and 30*c*, and sends the obtained vehicle log to vehicle log analysis server 20 using a communication protocol such as HTTPS. Details of the vehicle log will be given later.

Vehicle log analysis server 20 is a server, located outside vehicle 200, which receives the vehicle log from vehicle log transmission device 10, analyzes the received vehicle log, and detects a security threat, i.e., detects an anomaly in vehicle 200.

Configuration of Vehicle Log Transmission Device

Vehicle log transmission device 10 will be described next.

Figure 2:
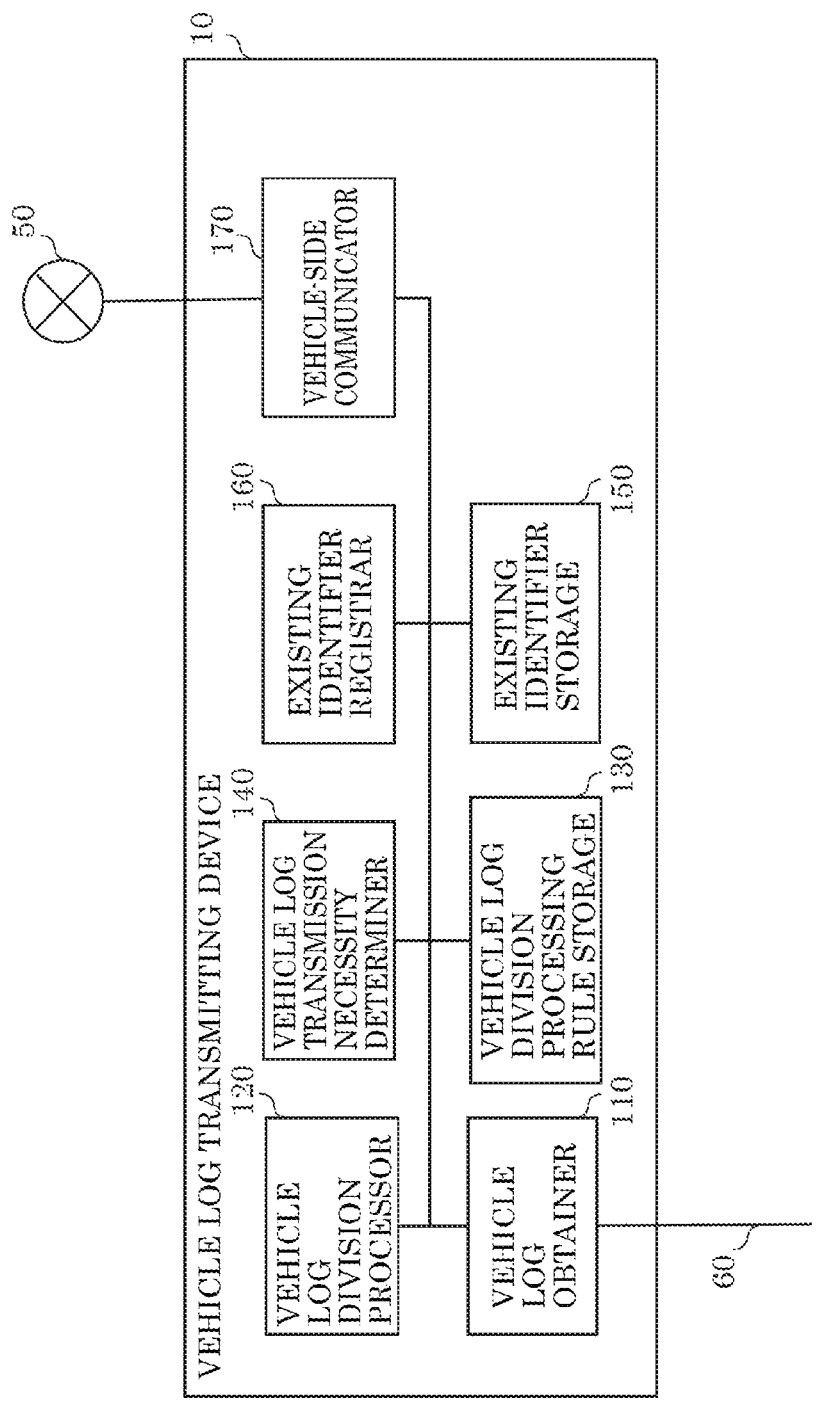
FIG. 2 is a block diagram illustrating a vehicle log transmission device according to Embodiment 1 of the present disclosure.

FIG. 2 is a block diagram illustrating vehicle log transmission device 10 according to Embodiment 1 of the present disclosure. Vehicle log transmission device 10 is a device that transmits a vehicle log, which includes a plurality of pieces of data with which IDs indicating data types are associated, to vehicle log analysis server 20. In FIG. 2, vehicle log transmission device 10 includes vehicle log obtainer 110, vehicle log division processor 120, vehicle log division processing rule storage 130, vehicle log transmission necessity determiner 140, existing identifier storage 150, existing identifier registrar 160, and vehicle-side communicator 170.

Vehicle log obtainer 110 is connected to vehicle system 300 over vehicle network 60. Vehicle log obtainer 110 obtains a vehicle log pertaining to operations of vehicle 200 (specifically, a vehicle log including a plurality of pieces of data with which IDs indicating data types are associated) and communicates the obtained vehicle log to vehicle log division processor 120. Note that the vehicle log may include a plurality of pieces of data arranged in such a manner that a plurality of the IDs starting with a predetermined ID repeat in a cyclical manner. Additionally, the vehicle log may include a plurality of pieces of data associated with corresponding pieces of time information.

Vehicle log division processor 120 generates one or more divided logs by dividing the vehicle log obtained by vehicle log obtainer 110 using the IDs included in the vehicle log. For example, vehicle log division processor 120 may generate the one or more divided logs by dividing the obtained vehicle log at each of the IDs included in the vehicle log. Additionally, for example, vehicle log division processor 120 may generate the one or more divided logs by dividing the obtained vehicle log at each of the plurality of IDs, starting with the predetermined ID, included in the vehicle log. Additionally, for example, vehicle log division processor 120 may generate a division processing log by further performing processing for replacing the time information included in the one or more divided logs with time index information. Additionally, for example, vehicle log division processor 120 may generate the division processing log by performing processing that sorts the one or more divided logs in accordance with a magnitude of an ID value or a data value included in the one or more divided logs. Additionally, for example, vehicle log division processor 120 may generate the division processing log by performing replacement processing for replacing a data value included in the one or more divided logs with a predetermined value or rounding processing for rounding the data value. Vehicle log division processor 120 has a function for generating the division processing log by dividing and processing the vehicle log according to rules and communicating the generated division processing log, along with a division number corresponding to a number used when dividing the vehicle log, to vehicle log transmission necessity determiner 140. The rules used by vehicle log division processor 120 when generating the division processing log are vehicle log division processing rules. Details of the vehicle log division processing rule and the division processing log will be given later.

Vehicle log division processing rule storage 130 stores the vehicle log division processing rules used by vehicle log division processor 120.

Existing identifier storage 150 stores an existing identifier list, which is a list of identifiers corresponding to existing divided logs generated by dividing an existing vehicle log shared between vehicle log transmission device 10 and vehicle log analysis server 20 using IDs included in the existing vehicle log. The identifiers are hash values, for example. For example, existing identifier storage 150 may store an existing identifier list that is a list corresponding to existing divided logs generated by dividing an existing vehicle log at each of the IDs included in the existing vehicle log. Additionally, for example, existing identifier storage 150 may store an existing identifier list that is a list of identifiers corresponding to existing divided logs generated by dividing an existing vehicle log at each of a plurality of IDs starting with a predetermined ID included in the existing vehicle log. Additionally, for example, existing identifier storage 150 may further store an existing identifier list that is a list of identifiers corresponding to existing divided logs in which the time information has been replaced with time index information. Additionally, for example, existing identifier storage 150 may further store an existing identifier list that is a list of identifiers corresponding to existing divided logs sorted by the magnitude of ID values or data values. Additionally, for example, existing identifier storage 150 may further store an existing identifier list that is a list of identifiers corresponding to existing divided logs which have been subjected to replacement processing or rounding processing. The existing identifier list is constituted by sets of division processing log division numbers and hash values transmitted from vehicle log transmission device 10 to vehicle log analysis server 20 in the past. The existing identifier list is shared between vehicle log transmission device 10 and vehicle log analysis server 20.

Vehicle log transmission necessity determiner 140 generates an identifier for each of the one or more divided logs, and of generated identifiers, determines that a divided log corresponding to an identifier present in the existing identifier list is a first divided log, and determines that a divided log corresponding to an identifier not present in the existing identifier list is a second divided log. Vehicle log transmission necessity determiner 140 generates a hash value for the division processing log received from vehicle log division processor 120, on a division number-by-division number basis, as the identifier. When the generated hash value for the division processing log is included in the existing identifier list stored by existing identifier storage 150, vehicle log transmission necessity determiner 140 determines that the division processing log corresponding to that hash value is a first divided log which need not be transmitted. When the generated hash value for the division processing log is not included in the existing identifier list stored by existing identifier storage 150, vehicle log transmission necessity determiner 140 determines that the division processing log corresponding to that hash value is a second divided log, which is necessary to be transmitted.

Existing identifier registrar 160 registers, in the existing identifier list, an identifier corresponding to the divided log determined to be the second divided log by vehicle log transmission necessity determiner 140 (the division processing log). Specifically, existing identifier registrar 160 additionally registers, in the existing identifier list in existing identifier storage 150, the hash value for the division processing log determined to be necessary to be transmitted by vehicle log transmission necessity determiner 140.

Vehicle-side communicator 170 transmits the identifier corresponding to the first divided log to vehicle log analysis server 20, and transmits the second divided log to vehicle log analysis server 20. Specifically, vehicle-side communicator 170 transmits, to vehicle log analysis server 20, the hash value and division number of the division processing log determined to not be necessary to be transmitted by vehicle log transmission necessity determiner 140 (the first divided log), and transmits, to vehicle log analysis server 20, the division processing log determined to be necessary to be transmitted by vehicle log transmission necessity determiner 140 (the second divided log). Furthermore, vehicle-side communicator 170 transmits the generated vehicle log division processing rules to vehicle log analysis server 20. For example, vehicle-side communicator 170 may transmit a time list indicating a correspondence relationship between the time information and the time index information to vehicle log analysis server 20 as the vehicle log division processing rules.

Configuration of Vehicle Log Analysis Server

Figure 3:
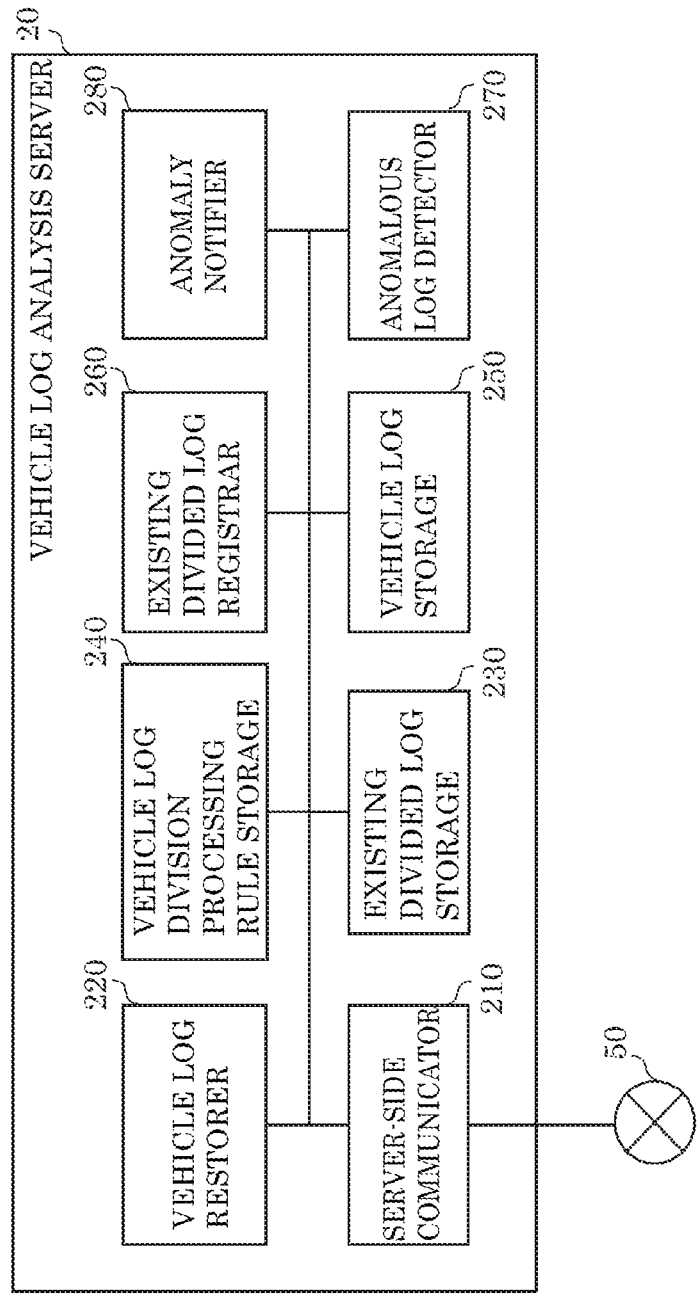
FIG. 3 is a block diagram illustrating a vehicle log analysis server according to Embodiment 1 of the present disclosure.

FIG. 3 is a block diagram illustrating vehicle log analysis server 20 according to Embodiment 1 of the present disclosure. Vehicle log analysis server 20 is a device that receives a vehicle log, which includes a plurality of pieces of data with which IDs indicating data types are associated, from vehicle log transmission device 10. As illustrated in FIG. 3, vehicle log analysis server 20 includes server-side communicator 210, vehicle log restorer 220, existing divided log storage 230, vehicle log division processing rule storage 240, vehicle log storage 250, existing divided log registrar 260, anomalous log detector 270, and anomaly notifier 280.

Server-side communicator 210 is connected to external network 50 and receives, over external network 50 from vehicle log transmission device 10, an identifier corresponding to the first divided log among the one or more divided logs generated by dividing the vehicle log using IDs included in the vehicle log, and the second divided log, among the one or more divided logs, that is not the first divided log. Specifically, server-side communicator 210 receives the division processing log or the hash value of the division processing log as well as the division number thereof, and communicates the received division processing log or hash value of the division processing log, and the division number thereof, to vehicle log restorer 220. Furthermore, server-side communicator 210 receives the vehicle log division processing rules from vehicle log transmission device 10 and stores the rules in vehicle log division processing rule storage 240. For example, server-side communicator 210 may receive, from vehicle log transmission device 10, an identifier corresponding to the first divided log among the one or more divided logs generated by dividing the vehicle log at each of the IDs included in the vehicle log, and the second divided log among the one or more divided logs. Additionally, for example, server-side communicator 210 may receive, from vehicle log transmission device 10, an identifier corresponding to the first divided log among the one or more divided logs generated by dividing the vehicle log at each of the plurality of the IDs, starting with the predetermined ID, included in the vehicle log, and the second divided log among the one or more divided logs. Additionally, for example, server-side communicator 210 may receive, from vehicle log transmission device 10, an identifier corresponding to the first divided log among the one or more divided logs in which time information has been replaced with time index information, the second divided log among the one or more divided logs, and a time list expressing a correspondence relationship between the time information and the time index information. Additionally, for example, server-side communicator 210 may receive an identifier corresponding to the first divided log among the one or more divided logs sorted by a magnitude of a value of an ID or a value of data, and the second divided log among the one or more divided logs. Additionally, for example, server-side communicator 210 may receive an identifier corresponding to the first divided log among the one or more divided logs subjected to replacement processing for replacing a value of data with a predetermined value or rounding processing that rounds the value of the data, and the second divided log among the one or more divided logs.

Existing divided log storage 230 stores an existing divided log list that is a list of existing divided logs generated by dividing an existing vehicle log shared between vehicle log transmission device 10 and vehicle log analysis server 20 using IDs included in the existing vehicle log and identifiers corresponding to the existing divided logs. For example, existing divided log storage 230 may store the existing divided log list that is a list of the existing divided logs generated by dividing the existing vehicle log at each of the IDs included in the existing vehicle log and identifiers corresponding to the existing divided logs. Additionally, for example, existing divided log storage 230 may store the existing divided log list that is a list of the existing divided logs generated by dividing the existing vehicle log at each of the plurality of the IDs, starting with the predetermined ID, included in the existing vehicle log and identifiers corresponding to the existing divided logs. Additionally, for example, existing divided log storage 230 may further store the existing divided log list that is a list of the existing divided logs in which the time information has been replaced with the time index information and identifiers corresponding to the existing divided logs. Additionally, for example, existing divided log storage 230 may further store the existing divided log list that is a list of the existing divided logs sorted by the magnitude of the value of the IDs or the value of the data, and the identifiers corresponding to the existing divided logs. Additionally, for example, existing divided log storage 230 may further store the existing divided log list that is a list of the existing divided logs subjected to the replacement processing or the rounding processing and identifiers corresponding to the existing divided logs.

Vehicle log restorer 220 restores the vehicle log by referring to the existing divided log list when the identifier corresponding to the first divided log has been received, obtaining the existing divided log corresponding to the identifier in the existing divided log list, and joining the second divided log with the existing divided log. Specifically, when the hash value of the division processing log and the division number thereof have been received from server-side communicator 210, vehicle log restorer 220 obtains an existing divided log matching the hash value of the division processing log from the existing divided log list stored by existing divided log storage 230.

Furthermore, when the division processing log (the second divided log) is communicated from server-side communicator 210 when the existing divided log is being obtained, vehicle log restorer 220 restores the existing divided log and the division processing log (the second divided log) into the vehicle log using the vehicle log division processing rules stored by vehicle log division processing rule storage 240. For example, vehicle log restorer 220 may restore the vehicle log by referring to the existing divided log list when the identifier corresponding to the first divided log has been received, obtaining the existing divided log corresponding to the identifier in the existing divided log list, referring to the time list and replacing the time index information included in the existing divided log with time information, and joining the second divided log with the existing divided log. Additionally, for example, vehicle log restorer 220 may restore the vehicle log by referring to the existing divided log list when the identifier corresponding to the first divided log has been received, obtaining the existing divided log corresponding to the identifier in the existing divided log list, referring to the time list and replacing the time index information in the existing divided log with time information, referring to the replaced time information and sorting the existing divided logs in order from the earliest time, and joining the second divided log with the existing divided log. Furthermore, vehicle log restorer 220 records the restored vehicle log in vehicle log storage 250. Details of the method for restoring the vehicle log will be given later.

Existing divided log registrar 260 generates, when the second divided log has been received, an identifier corresponding to the second divided log, and registers the second divided log and the identifier in the existing divided log list. Specifically, when the division processing log (the second divided log) has been communicated from server-side communicator 210, existing divided log registrar 260 generates a hash value of division processing log (the second divided log), and adds a set including the division processing log (the second divided log) and the hash value of the division processing log (the second divided log) to the existing divided log list in existing divided log storage 230.

Vehicle log division processing rule storage 240 stores the vehicle log division processing rules, in which division methods and processing methods for the vehicle log are denoted.

Vehicle log storage 250 stores the restored vehicle log.

Anomalous log detector 270 monitors the restored vehicle logs stored in vehicle log storage 250, detects a vehicle log which contains evidence of an attack as an anomalous log, and communicates the anomalous log to anomaly notifier 280. For example, when the vehicle logs include a log manipulated by a vehicle apparatus at a timing different from a normal processing sequence, a log in which network communication including control values has been performed outside a normal range, and so on, anomalous log detector 270 has a function for assuming this is evidence of a cyber attack on the vehicle, and detecting this as a security threat. Additionally, for example, anomalous log detector 270 may further: hold an anomalous identifier list that is a list of identifiers corresponding to anomalous divided logs generated by dividing a vehicle log previously determined to be anomalous using IDs included in the vehicle log; when server-side communicator 210 has received an identifier corresponding to the first divided log, detect an anomaly when the identifier is included in the anomalous identifier list; when server-side communicator 210 has received the second divided log, detect the second divided log as an anomalous log when the second divided log contains evidence of an attack; and register an anomalous divided log generated by dividing the anomalous log using IDs included in the anomalous log in the anomalous identifier list.

Anomaly notifier 280 notifies a predetermined notification target that there is an anomaly in the vehicle. Specifically, anomaly notifier 280 receives the anomalous vehicle log from anomalous log detector 270 and notifies, for example, an operator using vehicle log analysis server 20, a driver of the vehicle that output the anomalous log, or the like, who act as the predetermined notification target, of the anomaly.

Vehicle Log

FIG. 4 is a diagram illustrating an example of the vehicle log obtained by vehicle log obtainer 110 according to Embodiment 1 of the present disclosure. The vehicle log includes a plurality of pieces of data associated with corresponding IDs indicating data types. The vehicle log illustrated in FIG. 4 includes ID 1, ID 2, ID 3, and ID 4 as the IDs. Additionally, the vehicle log illustrated in FIG. 4 includes a plurality of pieces of data, each piece of data having 8 bytes. When the 8-byte data is taken as a single piece of data, an ID is associated with that single piece of data. Additionally, as illustrated in FIG. 4, the plurality of pieces of data are arranged in such a manner that a plurality of the IDs starting with a predetermined ID repeat in a cyclical manner. For example, assuming the predetermined ID is ID 1, the plurality of pieces of data are arranged so that when ID 1, ID 2, ID 3, and ID 4 are taken as a single cycle starting with ID 1, ID 1, ID 2, ID 3, and ID 4 repeat in a cyclical manner. Note that the predetermined ID is not limited to ID 1. For example, assuming the predetermined ID is ID 2, the plurality of pieces of data are arranged so that when ID 2, ID 3, ID 4, and ID 1 are taken as a single cycle starting with ID 2, ID 2, ID 3, ID 4, and ID 1 repeat in a cyclical manner. Additionally, as illustrated in FIG. 4, the plurality of pieces of data are associated with corresponding pieces of time information. For example, a time such as "10:10:10" (10 hours, 10 minutes, 10 seconds) is the time information. In FIG. 4, the vehicle log is constituted by a set including a time, an ID, and 8-byte data (eight pieces of 1-byte data). The time is the time at which the vehicle log was generated.

The ID is an identifier indicating the type of the data, and for example, specifies an event or a message serving as the basis for generating the vehicle log. For example, the ID is a process number when the vehicle log is an event indicating an ECU system operation; the ID is a frame ID when the vehicle log is a message based on the CAN or CAN-FD communication protocol; the ID is a slot ID when the vehicle log is a message based on the FlexRay communication protocol; and the ID is an IP address when the vehicle log is a message based on the Ethernet communication protocol.

Each of the plurality of pieces of data is, for example, 8-byte data constituted by hexadecimal values from 0x00 to 0xFF for each single byte. In FIG. 4, the data is indicated without the 0x hexadecimal notation. For example, in FIG. 4, the first line in the vehicle log is an event or message generated at time "10:10:10", where the ID is "ID 1", the first byte is "01" in hexadecimal notation, the second byte is "50" in hexadecimal notation, the third byte is "40" in hexadecimal notation, the fourth byte is "30" in hexadecimal notation, the fifth byte is "30" in hexadecimal notation, the sixth byte is "30" in hexadecimal notation, the seventh byte is "30" in hexadecimal notation, and the eighth byte is "30" in hexadecimal notation.

What the data value of each byte in the vehicle log represents is found by referring to the vehicle log definition table. Details of the vehicle log definition table will be given later.

Additionally, in FIG. 4, the vehicle log having an ID of "ID 1" is also generated at times "10:20:10", "10:50:10", and the like after being generated at time "10:10:10", which indicates that the event or message having an ID of "ID 1" is being generated periodically.

Additionally, in FIG. 4, the vehicle log having an ID of "ID 2" is indicated as having been generated after the event or message having an ID of "ID 1". In other words, the plurality of pieces of data are arranged so that the plurality of IDs (here, ID 1, ID 2, ID 3, and ID 4) repeat in a cyclical manner.

In this manner, the generation time and data of an event or message can be confirmed by referring to the vehicle log. Accordingly, whether or not vehicle system 300 has operated at a timing different from a normal processing sequence, whether or not network communication including a control value outside of normal range was performed, and so on can be determined using the vehicle log, which makes it possible to detect security threats.

Vehicle Log Definition Table

FIG. 5 is a diagram illustrating an example of the vehicle log definition table used by vehicle log division processor 120 according to Embodiment 1 of the present disclosure. The vehicle log definition table is a table that defines data types indicating what the data value of each byte represents for each ID in the vehicle log.

In FIG. 5, when the ID is "ID 1", the first byte defines "counter", and the second to eighth bytes define "vehicle number".

When the ID is "ID 2", the first byte defines "counter", the second byte defines "checksum", the third and fourth bytes define "speed", the fifth byte defines "shift", and the sixth to eighth bytes are unused and are therefore undefined.

When the ID is "ID 3", the first byte defines "counter", the second byte defines "checksum", the third and fourth bytes define "steering angle", and the fifth to eighth bytes are unused and are therefore undefined.

When the ID is "ID 4", the first byte defines "counter", the second and third bytes define "location information", and the fourth to eighth bytes are unused and are therefore undefined.

The "vehicle number" which is defined is a 7-byte value, and is a fixed value for each vehicle. The "speed", "steering angle", and "location information" which are defined are 2-byte values, and are values from 0000 to FFFF. The "checksum" and "counter" which are defined are 1-byte values, and are values from 00 to FF. The "shift" which is defined indicates "parking" when the value is "00" and "drive" when the value is "01".

Vehicle Log Division Processing Rules

The vehicle log division processing rules will be described next. The vehicle log division processing rules are rules indicating what kind of rules were used when vehicle log division processor 120 generated the division processing log from the vehicle log. The vehicle log division processing rules are generated when vehicle log division processor 120 generates the division processing log from the vehicle log.

FIG. 6 is a diagram illustrating an example of the vehicle log division processing rules stored by vehicle log division processing rule storage 130 according to Embodiment 1 of the present disclosure. In FIG. 6, the vehicle log division processing rules are constituted by a set of a processing item, processing Y/N, a value before processing, and a value after processing.

The processing item is one of "division", "time index", "sorting (ascending order)", and "data replacement". The vehicle log division processing rules indicate rules for processing the vehicle log in order from the top.

"Division" indicates rules for dividing the vehicle log. For example, in FIG. 6, "division" indicates rules for dividing the vehicle log at each ID.

"Time index" indicates rules for processing that replaces the times in the vehicle logs with time index information. For example, in FIG. 6, time index indicates rules for assigning serial numbers (T11, T12, and so on up to T54) to the times for each ID.

"Sorting (ascending order)" indicates rules for processing the vehicle logs so that a specific byte of the data having the same ID, e.g., the data in the fourth byte, is sorted in order from the lowest data. Although FIG. 6 illustrates "data sorting (ascending order)" as one example, when the data of a specific byte among the data having the same ID is sorted in order from the highest data, this is indicated as "data sorting (descending order)".

"Data replacement" indicates a rule for processing that replaces the entirety of a data region corresponding to a specific data type (e.g., counter and checksum) denoted in the vehicle log definition table with a specific value (e.g., 00).

Next, processing Y/N is either "yes" or "no", and indicates whether or not the rules have been applied to the corresponding processing item. When the rules have been applied to the corresponding processing item, processing Y/N is "yes", whereas when the rules have not been applied to the corresponding processing item, processing Y/N is "no".

The value before processing indicates the original value for the corresponding processing item in the vehicle log, whereas the value after processing indicates a value after processing the corresponding processing item in the vehicle log (i.e., the value in the division processing log).

In FIG. 6, processing Y/N is "yes" for the processing item "division". For the value before processing "ID 1", a value after processing is "division number 1", and for the value before processing "ID 2", a value after processing is "division number 2". According to these rules, data including the ID denoted in the value before processing is extracted from the vehicle log, and is divided into a divided log having the division number denoted in value after processing.

In FIG. 6, processing Y/N is "yes" for the processing item "time index". For the value before processing of "10:10:10", the value after processing is "T11", and for the value before processing of "10:10:20", the value after processing is "T12".

In FIG. 6, processing Y/N is "yes" for the processing item "sorting (ascending order)". The value before processing and the value after processing are both "-", and "-" indicates a rule that the values are not to be replaced. This is because although the data is sorted with "sorting (ascending order)", the data values themselves are not replaced.

Additionally, processing Y/N is "yes" for the processing item "data replacement" and the values before processing indicate the values of "counter" and "checksum", and this indicates a rule that the values of "counter" and "checksum" after processing are replaced with "00".

When generating a division processing log from the vehicle log, vehicle log division processor 120 also generates the vehicle log division processing rules, and the vehicle log division processing rules are shared between vehicle log transmission device 10 and vehicle log analysis server 20 by also transmitting the vehicle log division processing rules when transmitting the division processing log or the division processing log identifier. As a result, a division processing log processed by vehicle log transmission device 10 can be restored to the original vehicle log by vehicle log analysis server 20. Note that when the division processing log has been generated using predetermined rules and the existing divided log is generated using the predetermined rules, a time list indicating a correspondence relationship between at least the time information and the time index information may be transmitted from vehicle log transmission device 10 to vehicle log analysis server 20 as the vehicle log division processing rules when the predetermined rules are already held in vehicle log transmission device 10 and vehicle log analysis server 20 in advance. This is because vehicle log analysis server 20 can restore information aside from the time information using predetermined rules.

Division Processing Log

FIG. 7 is a diagram illustrating an example of the division processing log generated by vehicle log division processor 120 according to Embodiment 1 of the present disclosure. FIG. 7 is an example of the division processing log obtained when the vehicle log illustrated in FIG. 4 is processed according to the vehicle log division processing rules illustrated in FIG. 6. In FIG. 7, the division processing log is constituted by a set including a time, an ID, and 8-byte data for each division number. FIG. 7 illustrates an example in which the division processing log is divided at each ID.

In FIG. 7, the time in the division processing log has been converted to a time index (T11, T12, and so on up to T54) in accordance with the "time index" rule in the vehicle log division processing rules illustrated in FIG. 6. For example, time "T11" for division number "1" is a time index obtained when replacing the time "10:10:10".

Additionally, in FIG. 7, the values of the data of the fourth byte in the lines with times "T13", "T23", and "T53" for division number "3" are "10", "20", and "30", respectively, and are sorted in order from the lowest data of the fourth byte, in accordance with the rule "sorting (ascending order)" in the vehicle log division processing rules illustrated in FIG. 6.

According to the vehicle log definition table illustrated in FIG. 5, the first byte in the division processing log is "counter", and the values of the data are all replaced with "00" according to the rule "data replacement" in the vehicle log division processing rules illustrated in FIG. 6.

As described above, in the division processing log, values which are highly likely to change when a vehicle log is generated, such as time, counter, checksum, event occurrence time, and the like, are converted to an index or are replaced with "00" or the like. Note that in the division processing log, rounding processing may be performed to round detailed values from sensors of the like.

Although FIG. 7 illustrates an example of the divided log (the division processing log) obtained when the vehicle log is divided at each ID, the vehicle log may be divided at each of a plurality of the IDs starting with a predetermined ID. For example, when ID 1 is taken as the predetermined ID, the vehicle log may be divided at each of a plurality of IDs starting with ID 1 (ID 1, ID 2, ID 3, and ID 4). Note that the predetermined ID is not limited to ID 1, and for example, when ID 2 is taken as the predetermined ID, the vehicle log may be divided at each of a plurality of IDs starting with ID 2 (ID 2, ID 3, ID 4, and ID 1).

Similarly, the existing divided log, which will be described later, may be divided at each of a plurality of the IDs starting with a predetermined ID.

Division Processing Log Identifier

The division processing log identifier will be described next.

FIG. 8 is a diagram illustrating an example of the identifier of the division processing log generated by vehicle log transmission necessity determiner 140 according to Embodiment 1 of the present disclosure. In FIG. 8, the division processing log identifier is constituted by a division number and an identifier. Vehicle log transmission necessity determiner 140 generates a hash value of the division processing log for each division processing log using a hash function, and takes that hash value as the identifier.

Here, the hash function has a characteristic of outputting the same hash value for the same data, and uses an algorithm such as MD5, SHA 256, or the like.

In FIG. 8, the identifier is "11223344" for division number "1", for example.

Existing Identifier List

The existing identifier list will be described next.

FIG. 9 is a diagram illustrating an example of the existing identifier list stored by existing identifier storage 150 according to Embodiment 1 of the present disclosure. In FIG. 9, the existing identifier list is constituted by a set including a number and an identifier. "Number" indicates an order of registration in the existing identifier list, and "identifier" indicates the hash value corresponding to the division processing log (existing divided log) already transmitted to vehicle log analysis server 20.

In FIG. 9, the identifier is "11223344" for number "1", for example.

Existing Divided Log List

The existing divided log list will be described next. FIG. 10 is a diagram illustrating an example of the existing divided log list stored by existing divided log storage 230 according to Embodiment 1 of the present disclosure. In FIG. 10, the existing divided log list is constituted by a set including a number, an identifier, a file path, and anomaly Y/N. "Number" indicates an order of registration in the existing divided log list; "identifier" indicates a hash value corresponding to the existing divided log; "file path" indicates the location where the existing divided log is stored; and "anomaly Y/N" indicates "yes" or "no" for a result of detecting an anomaly in the existing divided log. The anomaly Y/N list (anomalous identifier list) is a list of identifiers corresponding to anomalous divided logs generated by dividing a vehicle log, which has previously been determined to be anomalous, using the IDs included in that vehicle log (e.g., the existing divided log corresponding to number 2 or number 6).

In FIG. 10, for number "1", for example, the identifier is "11223344", the file path of the existing divided log is "/log/20180101A.log", and anomaly Y/N for the existing divided log is "no".

Vehicle log restorer 220 compares the hash value transmitted from vehicle log transmission device 10 to vehicle log analysis server 20 with the hash value included in the existing identifier list, and because an existing divided log is stored in the file path corresponding to the matching hash value, vehicle log restorer 220 restores the vehicle log using that existing divided log.

Vehicle Log Transmission Processing Sequence

Processing for transmitting a vehicle log, performed by vehicle log transmission device 10, will be described next.

Figure 11:
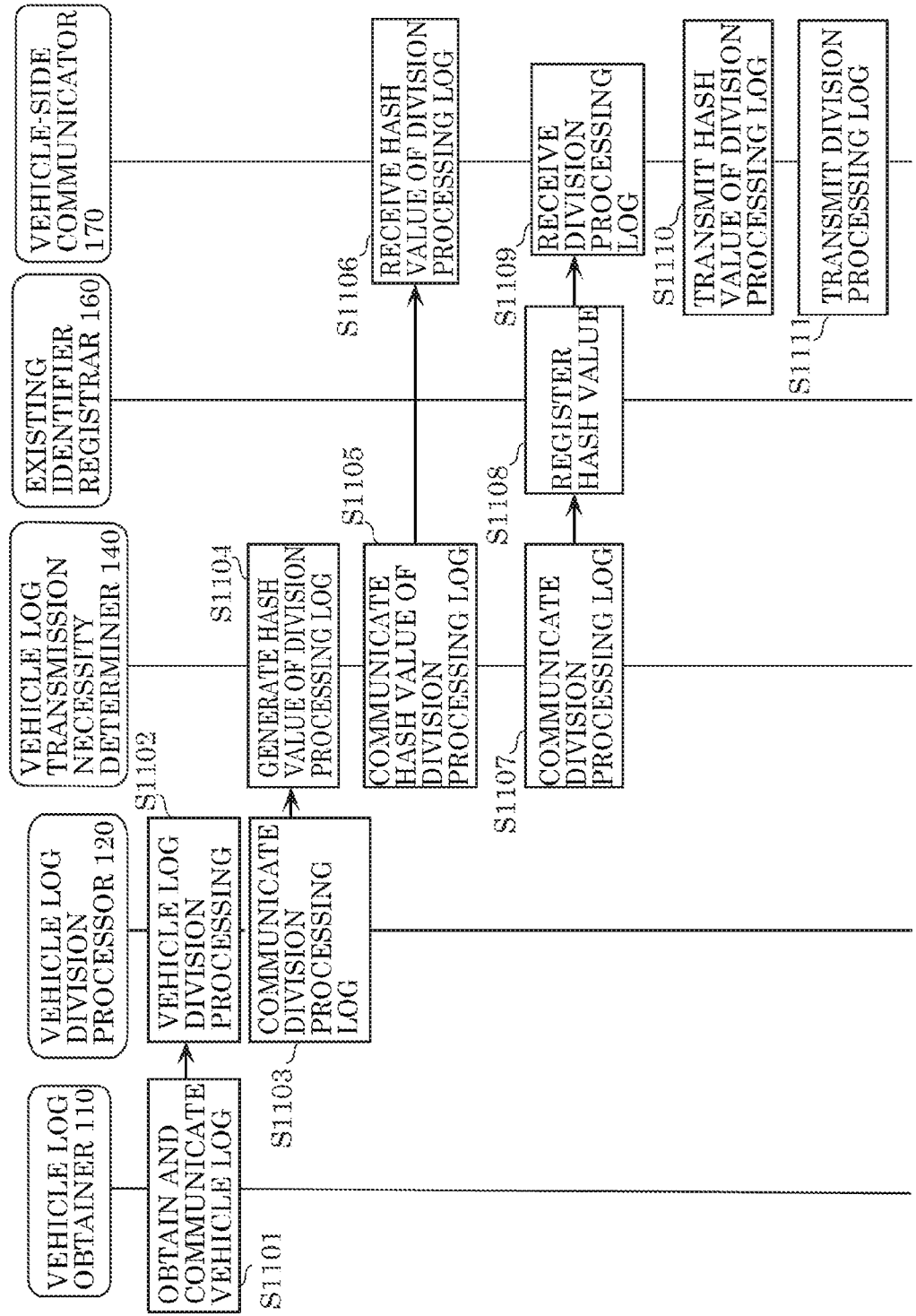
FIG. 11 is a diagram illustrating a sequence in vehicle log transmission processing according to Embodiment 1 of the present disclosure.

FIG. 11 is a diagram illustrating a processing sequence through which vehicle log transmission device 10 transmits a vehicle log according to Embodiment 1 of the present disclosure.

(S1101) Vehicle log obtainer 110 of vehicle log transmission device 10 obtains the vehicle log and communicates the vehicle log to vehicle log division processor 120.

(S1102) Vehicle log division processor 120 obtains the vehicle log and generates the division processing log from the vehicle log using the vehicle log definition table. The rules used when generating the division processing log are taken as the vehicle log division processing rules.

(S1103) Vehicle log division processor 120 communicates the division processing log to vehicle log transmission necessity determiner 140. Although not illustrated, at this time, vehicle log division processor 120 stores the vehicle log division processing rules in vehicle log division processing rule storage 130 in addition to communicating the vehicle log division processing rules to vehicle-side communicator 170.

(S1104) Vehicle log transmission necessity determiner 140 obtains the division processing log and generates a hash value of the division processing log.

(S1105) When the generated hash value is included in the existing identifier list stored by existing identifier storage 150, vehicle log transmission necessity determiner 140 communicates the hash value of the division processing log (the identifier corresponding to the first divided log) and the division number to vehicle-side communicator 170.

(S1106) Vehicle-side communicator 170 receives the obtained hash value and division number.

(S1107) When the generated hash value is not included in the existing identifier list stored by existing identifier storage 150, vehicle log transmission necessity determiner 140 communicates the division processing log (the second divided log) to vehicle-side communicator 170, and communicates the hash value of the division processing log (the second divided log) to existing identifier registrar 160.

(S1108) Existing identifier registrar 160 additionally registers the received hash value in the existing identifier list in existing identifier storage 150. The received hash value is also registered by vehicle log analysis server 20 in step S1205 in FIG. 12, described later, and is therefore shared between vehicle log transmission device 10 and vehicle log analysis server 20.

(S1109) Vehicle-side communicator 170 obtains the division processing log (the second divided log).

(S1110) Vehicle-side communicator 170 transmits the obtained hash value of the division processing log (the first divided log), the division number, and the vehicle log division processing rules to vehicle log analysis server 20.

(S1111) Vehicle-side communicator 170 transmits the obtained division processing log (the second divided log) and the vehicle log division processing rules to vehicle log analysis server 20.

Vehicle Log Reception Processing Sequence

Processing for receiving a vehicle log, performed by vehicle log analysis server 20, will be described next.

Figure 12:
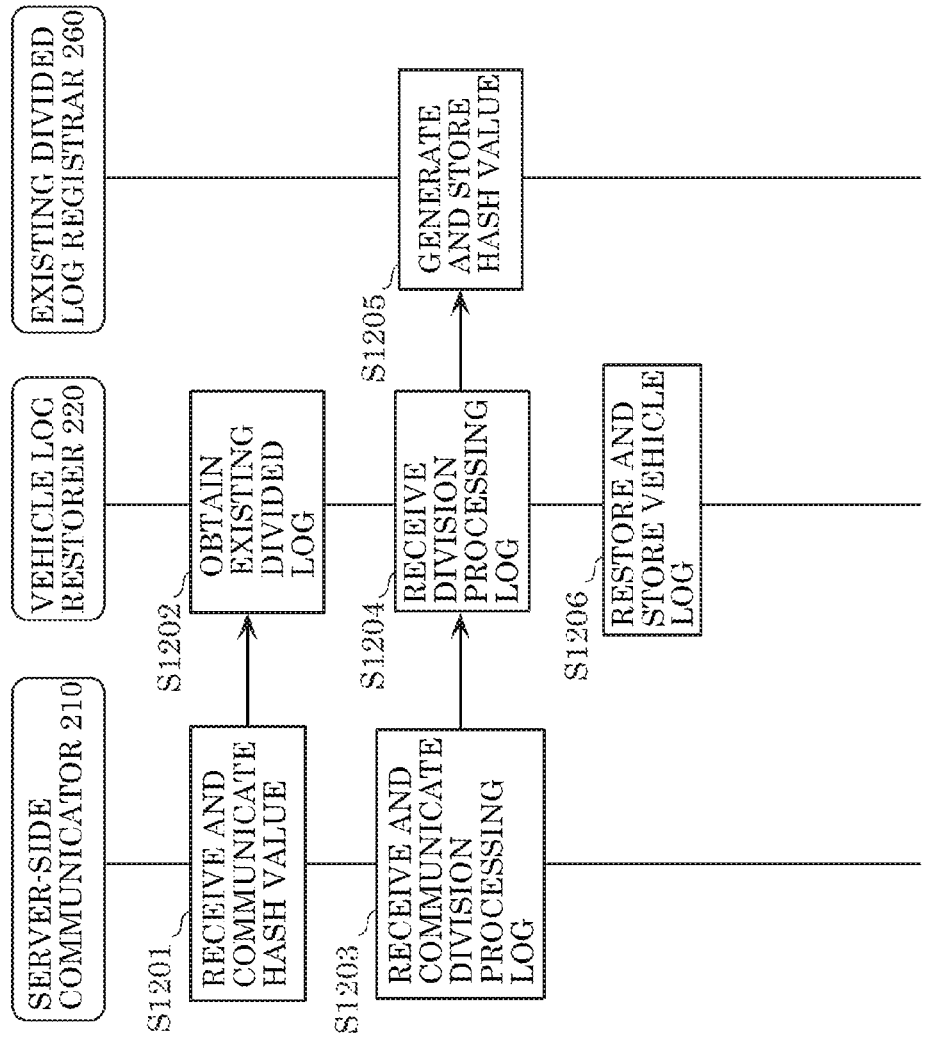
FIG. 12 is a diagram illustrating a sequence in vehicle log reception processing according to Embodiment 1 of the present disclosure.

FIG. 12 illustrates a processing sequence through which vehicle log analysis server 20 receives a vehicle log according to Embodiment 1 of the present disclosure.

(S1201) Server-side communicator 210 receives the hash value of the division processing log (the first divided log), the division number, and the vehicle log division processing rules from vehicle log transmission device 10, and communicates the hash value of the division processing log (the first divided log), the division number, and the vehicle log division processing rules to vehicle log restorer 220. Although not illustrated, server-side communicator 210 communicates the hash value of the division processing log (the first divided log) to anomalous log detector 270.

(S1202) Vehicle log restorer 220 obtains the hash value of the division processing log (the first divided log), the division number, and the vehicle log division processing rules, obtains, from the existing divided log list stored by existing divided log storage 230, the file path of an existing divided log having the same hash value as the hash value of the division processing log (the first divided log), and obtains the existing divided log from that file path.

(S1203) Server-side communicator 210 receives the division processing log (the second divided log) and the vehicle log division processing rules, and communicates the division processing log (the second divided log) and the vehicle log division processing rules to vehicle log restorer 220.

(S1204) Vehicle log restorer 220 receives the division processing log (the second divided log), the division number, and the vehicle log division processing rules.

(S1205) Existing divided log registrar 260 obtains the division processing log (the second divided log), generates a hash value of the division processing log (the second divided log), and additionally registers the file path where the division processing log (the second divided log) is stored and the generated hash value in the existing divided log list in existing divided log storage 230. The division processing log (the second divided log) received by server-side communicator 210 this time serves as the existing divided log thereafter.

(S1206) Vehicle log restorer 220 restores the vehicle log using the existing divided log having the same hash value as the hash value of the first divided log, the division processing log (the second divided log), and the vehicle log division processing rules.

Anomalous Log Detection Processing Sequence

Anomalous log detection processing performed by vehicle log analysis server 20 will be described next.

Figure 13:
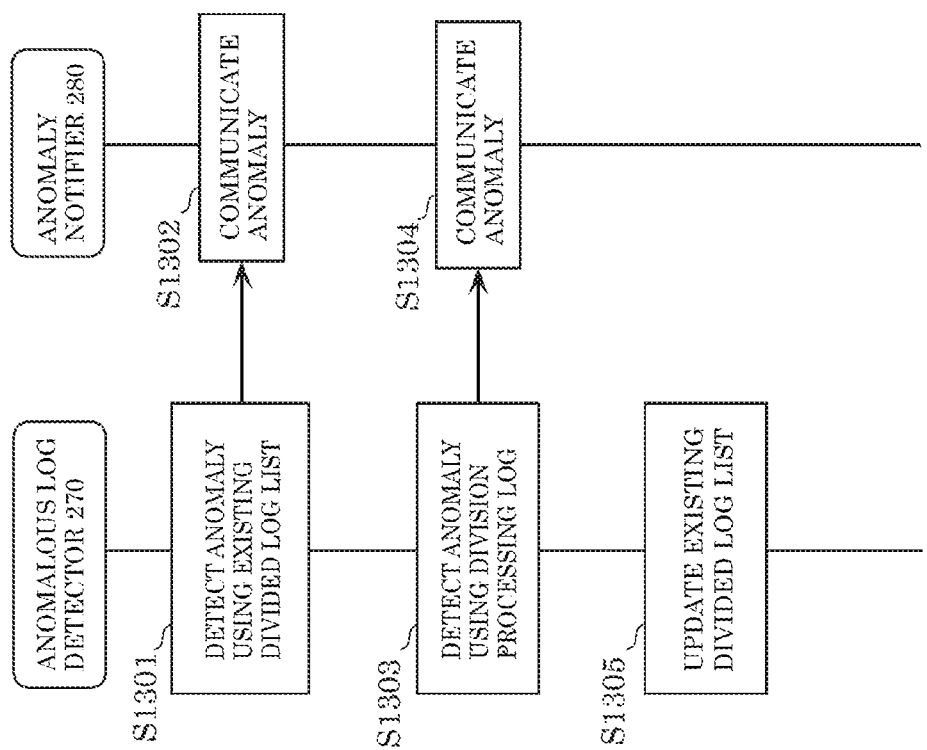
FIG. 13 is a diagram illustrating a sequence in anomalous log detection processing according to Embodiment 1 of the present disclosure.

FIG. 13 illustrates a processing sequence through which vehicle log analysis server 20 detects an anomalous log according to Embodiment 1 of the present disclosure.

(S1301) Anomalous log detector 270 specifies a line in which the hash value of the division processing log (the first divided log) matches the hash value for the "identifier" item in the existing divided log list stored in existing divided log storage 230, determines that there is an anomaly when anomaly Y/N is "yes", and communicates the anomaly to anomaly notifier 280.

(S1302) Anomaly notifier 280 communicates the anomaly to, for example, a user of vehicle log analysis server 20 or the driver of the vehicle in which the anomalous vehicle log was generated, as a predetermined notification target.

(S1303) When the division processing log (the second divided log) contains evidence of an attack, anomalous log detector 270 determines this as an anomaly, and communicates the anomaly to anomaly notifier 280.

(S1304) Anomaly notifier 280 communicates the anomaly to, for example, a user of vehicle log analysis server 20 or the driver of the vehicle in which the anomalous vehicle log was generated, as a predetermined notification target.

(S1305) Anomalous log detector 270 updates the registration of the detected anomaly in the existing divided log list in existing divided log storage 230. Specifically, anomalous log detector 270 updates the existing divided log list by associating "yes" for anomaly Y/N with the file path where the division processing log (the second divided log) is stored and the generated hash value.

Flowchart of Division Processing Log Generation Processing

Processing through which vehicle log division processor 120 generates the division processing log from the vehicle log according to the rules will be described next. The rules are settings made by a user of vehicle log analysis system 100, a user of vehicle 200, or the like, for example.

Figure 14:
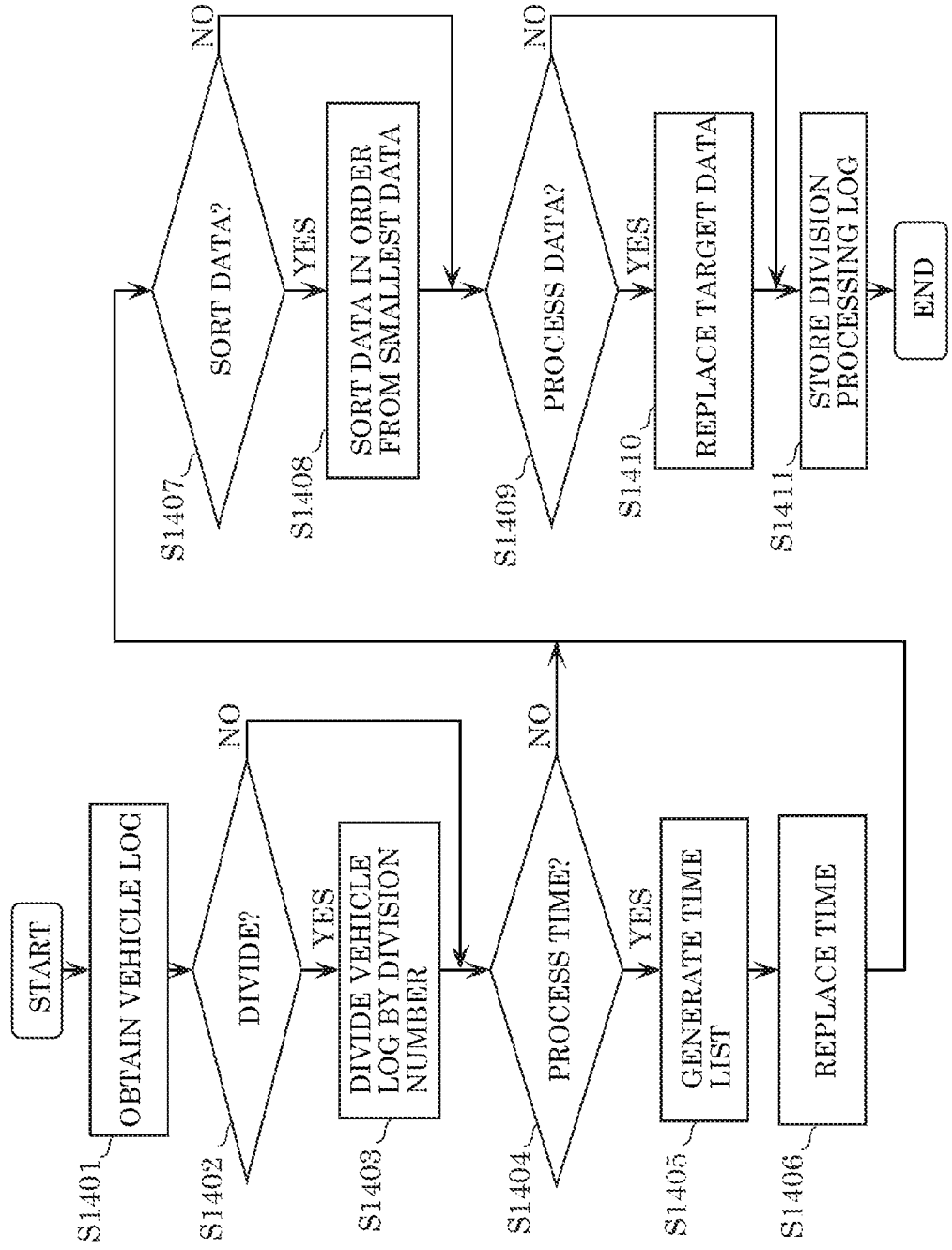
FIG. 14 is a flowchart illustrating vehicle log division processing according to Embodiment 1 of the present disclosure.

FIG. 14 is a flowchart illustrating the division processing log generation processing performed by vehicle log division processor 120 according to Embodiment 1 of the present disclosure.

(S1401) Vehicle log division processor 120 obtains the vehicle log from vehicle log obtainer 110.

(S1402) Vehicle log division processor 120 determines whether or not to divide the vehicle log at each of the IDs in accordance with the rules. When it is determined that the vehicle log is to be divided at each of the IDs (YES), vehicle log division processor 120 generates vehicle log division processing rules with the processing item being "division" and processing Y/N being "yes". Vehicle log division processor 120 then creates a list using the ID of the vehicle log as the value before processing and a serial number, serving as the division number, as the value after processing. Vehicle log division processor 120 then performs the processing of step S1403. When it is determined that the vehicle log is not to be divided at each of the IDs (NO), vehicle log division processor 120 generates vehicle log division processing rules with the processing item being "division" and processing Y/N being "no". Vehicle log division processor 120 then performs the processing of step S1404.

When vehicle log division processor 120 determines that the vehicle log is to be divided at each of the IDs, this means, for example, that the stated rule is a rule (a setting) for dividing the vehicle log at each of the IDs. Additionally, when vehicle log division processor 120 determines that the vehicle log is not to be divided at each of the IDs, this means, for example, that the stated rule is a rule (a setting) for not dividing the vehicle log at each of the IDs. The vehicle log division processing rules generated after the determination in step S1402 correspond to the line for "division" in FIG. 6.

(S1403) Vehicle log division processor 120 divides the vehicle log at each of the IDs, and generates a divided log for each division number.

(S1404) Vehicle log division processor 120 determines whether or not to process the "time" in the vehicle log in accordance with the rules. When vehicle log division processor 120 determines that the "time" in the vehicle log is to be processed (YES), the processing of step S1405 is performed. When vehicle log division processor 120 determines that the "time" in the vehicle log is not to be processed (NO), the vehicle log division processing rules are generated with the processing item being "time index" and processing Y/N being "no". Vehicle log division processor 120 then performs the processing of step S1407.

(S1405) Vehicle log division processor 120 generates a time list with the processing item being "time index", processing Y/N being "yes", the time of the vehicle log being the value before processing, and the serial numbers of the time index being the value after processing.

When vehicle log division processor 120 determines that the "time" in the vehicle log is to be processed, this means, for example, that the stated rule is a rule (a setting) that the "time" in the vehicle log is to be processed. Additionally, when vehicle log division processor 120 determines that the "time" in the vehicle log is not to be processed, this means, for example, that the stated rule is a rule (a setting) that the "time" in the vehicle log is not to be processed. The vehicle log division processing rules generated in step S1405 correspond to the "time index" line in FIG. 6, and these vehicle log division processing rules are an example of the time list indicating the correspondence relationship between the time information and the time index information. From this time list, it can be seen, for example, that the time "10:10:10" and the time index "T11" correspond.

(S1406) Vehicle log division processor 120 refers to the value before processing and the value after processing in the time list, and replaces the time in the vehicle log with the serial numbers of the time index, which is the value after processing.

(S1407) Vehicle log division processor 120 determines whether or not to sort the "data" in the vehicle log in order from the smallest data in accordance with the rules. When vehicle log division processor 120 determines to sort the "data" in the vehicle log (YES), the vehicle log division processing rules are generated with the processing item being "sorting (ascending order)", processing Y/N being "yes", the value before processing being "-", and the value after processing being "-". Vehicle log division processor 120 then performs the processing of step S1408. When vehicle log division processor 120 determines not to sort the "data" in the vehicle log (NO), the vehicle log division processing rules are generated with the processing item being "sorting (ascending order)" and processing Y/N being "no". Vehicle log division processor 120 then performs the processing of step S1411.

When vehicle log division processor 120 determines to sort the "data" in the vehicle log, this means, for example, that the stated rule is a rule (a setting) that the "data" in the vehicle log is to be sorted. Additionally, when vehicle log division processor 120 determines to not sort the "data" in the vehicle log, this means, for example, that the stated rule is a rule (a setting) that the "data" in the vehicle log is not to be sorted. The vehicle log division processing rules generated after the determination in step S1407 correspond to the line for "sorting (ascending order)" in FIG. 6.

(S1408) Vehicle log division processor 120 sorts the vehicle logs in order from the smallest data.

(S1409) Vehicle log division processor 120 determines whether or not to process predetermined "data" in the vehicle log in accordance with the rules. When vehicle log division processor 120 determines to process the predetermined "data" in the vehicle log (YES), the vehicle log division processing rules are generated with the processing item being "data replacement", processing Y/N being "yes", the value before processing being "counter", the value after processing being "00", the value before processing being "checksum", and the value after processing being "00". Vehicle log division processor 120 then performs the processing of step S1410. When vehicle log division processor 120 determines not to process the predetermined "data" in the vehicle log (NO), the vehicle log division processing rules are generated with the processing item being "data replacement" and processing Y/N being "no". Vehicle log division processor 120 then performs the processing of step S1411.

When vehicle log division processor 120 determines to process the predetermined "data" in the vehicle log, this means, for example, that the stated rule is a rule (a setting) that the predetermined "data" in the vehicle log is to be processed. Additionally, when vehicle log division processor 120 determines not to process the predetermined "data" in the vehicle log, this means, for example, that the stated rule is a rule (a setting) that the predetermined "data" in the vehicle log is not to be processed. The vehicle log division processing rules generated after the determination in step S1409 correspond to the line for "data replacement" in FIG. 6.

(S1410) Vehicle log division processor 120 replaces the value of counter with "00" and the value of checksum with "00" in the vehicle log.

(S1411) Vehicle log division processor 120 stores the division processing log obtained by dividing and processing the vehicle log.

Flowchart of Division Processing Log Transmission Processing

Processing for determining whether or not to transmit the division processing log, performed by vehicle log transmission necessity determiner 140, will be described next.

Figure 15:
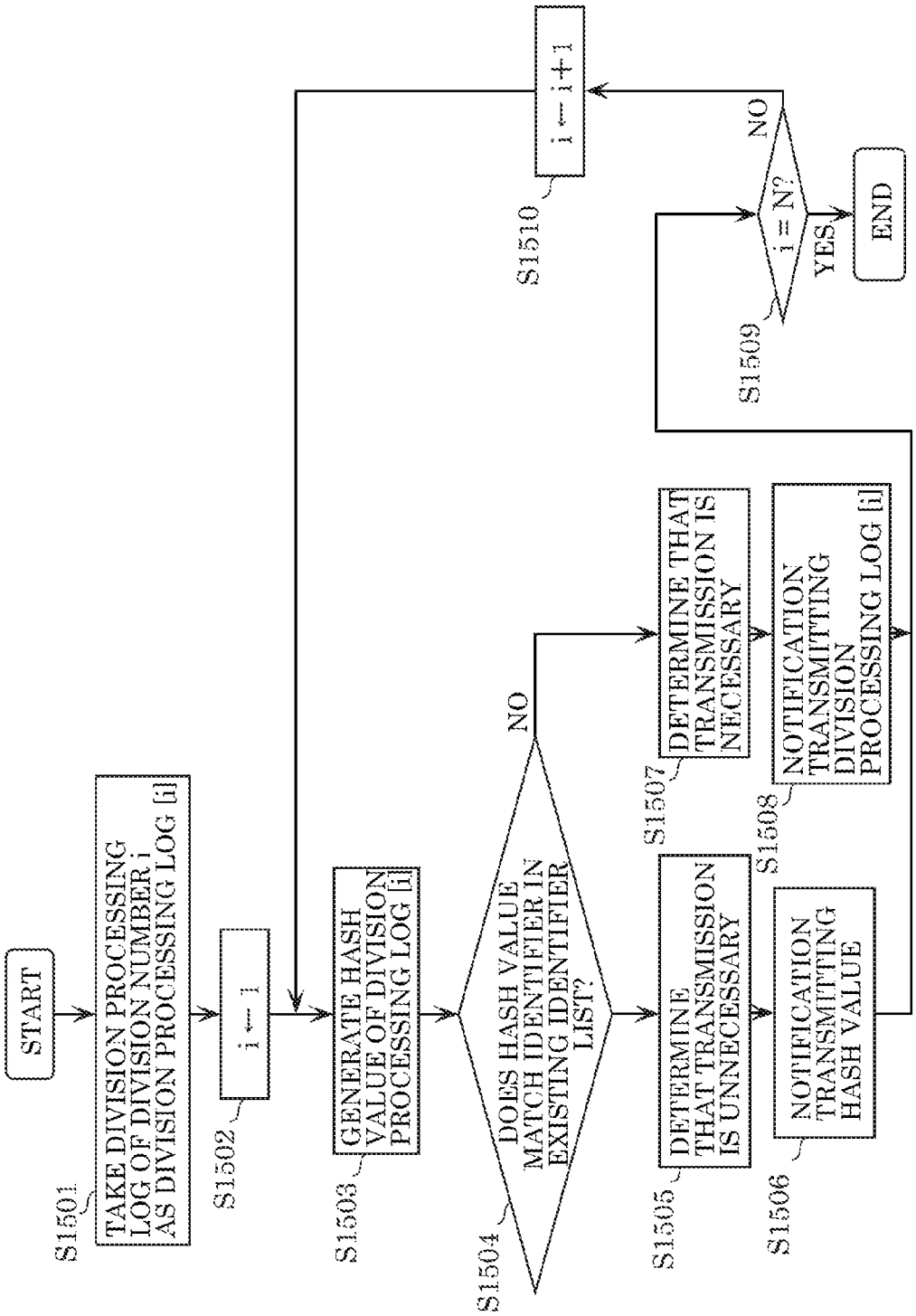
FIG. 15 is a flowchart illustrating division processing log transmission processing according to Embodiment 1 of the present disclosure.

FIG. 15 is a flowchart illustrating the division processing log transmission processing performed by vehicle log transmission necessity determiner 140 according to Embodiment 1 of the present disclosure.

(S1501) Vehicle log transmission necessity determiner 140 obtains, from vehicle log division processor 120, a division processing log for each division number, and takes each obtained division processing log as a division processing log [i]. Here, i represents the division number, and is an integer from 1 to N, where N represents the number of divisions of the vehicle log.

(S1502) Vehicle log transmission necessity determiner 140 sets i to 1.

(S1503) Vehicle log transmission necessity determiner 140 generates a hash value for the division processing log [i].

(S1504) Vehicle log transmission necessity determiner 140 determines whether or not the generated hash value matches the identifier (the hash value) of the existing identifier list in existing identifier storage 150. In other words, vehicle log transmission necessity determiner 140 determines whether or not the generated hash value is present in the existing identifier list. Vehicle log transmission necessity determiner 140 performs the processing of step S1505 when the generated hash value is present in the existing identifier list (YES), and performs the processing of step S1507 when the generated hash value is not present in the existing identifier list (NO).

(S1505) Vehicle log transmission necessity determiner 140 determines that the division processing log [i] in question is the first divided log, which does not need to be transmitted to vehicle log analysis server 20.

(S1506) Vehicle log transmission necessity determiner 140 generates a hash value corresponding to the division processing log [i] in question, and communicates the generated hash value to vehicle-side communicator 170 to be transmitted to vehicle log analysis server 20.

(S1507) Vehicle log transmission necessity determiner 140 determines that the division processing log [i] in question is the second divided log, which needs to be transmitted to vehicle log analysis server 20.

(S1508) Vehicle log transmission necessity determiner 140 communicates the division processing log [i] in question to vehicle-side communicator 170 to be transmitted to vehicle log analysis server 20.

(S1509) Vehicle log transmission necessity determiner 140 determines whether or not i is N, ends the processing when i is N (YES), and performs the processing of step S1510 when i is not N (NO).

(S1510) Vehicle log transmission necessity determiner 140 adds 1 to i. Through steps S1509 and S1510, the processing from step 1503 to step S1508 can be performed a number of times equal to the number of divisions in the vehicle log.

Flowchart of Vehicle Log Restoration Processing

Processing for restoring the received division processing log (the second divided log) or the hash value (the identifier corresponding to the first divided log) to the vehicle log, performed by vehicle log restorer 220, will be described next.

FIG. 16 is a flowchart illustrating the vehicle log restoration processing performed by vehicle log restorer 220 according to Embodiment 1 of the present disclosure. The division processing log obtained from vehicle log transmission device 10 is assumed to be the division processing log [i]. Here, i represents the division number, and is an integer from 1 to N, where N represents the number of divisions of the vehicle log.

(S1601) Vehicle log restorer 220 obtains, from server-side communicator 210, N numbers' worth of division processing logs [i] or hash values of division processing logs [i].

(S1602) Vehicle log restorer 220 takes i as 1.

(S1603) Vehicle log restorer 220 determines whether or not the obtained item is a hash value. When the obtained item is a hash value of the division processing log [i] (YES), vehicle log restorer 220 performs the processing of step S1604. However, when the obtained item is not a hash value of the division processing log [i], i.e., is the division processing log [i] (NO), vehicle log restorer 220 performs the processing of step S1605.

(S1604) Vehicle log restorer 220 finds the identifier matching the hash value of the division processing log [i] in the existing divided log list in existing divided log storage 230, and obtains the existing divided log [i] from the file path corresponding to the identifier.

(S1605) Vehicle log restorer 220 determines whether or not processing Y/N is "yes" for the processing item "time index" in the vehicle log division processing rules stored in vehicle log division processing rule storage 240. When vehicle log restorer 220 determines that this is "yes" (YES), the processing of step S1606 is performed, whereas when vehicle log restorer 220 determines that this is "no" (NO), the processing of step S1608 is performed.

(S1606) When the division processing log [i] or the time (time index) of an existing divided log [i] matches the value after processing for the processing item of "time index" in the vehicle log division processing rules, vehicle log restorer 220 replaces the value before processing of the processing item of "time index" in the vehicle log division processing rules with the time of the division processing log [i] or the existing divided log [i].

(S1607) Vehicle log restorer 220 sorts the division processing logs [i] or the existing divided logs [i] in order from the earliest time. Through steps S1606 and S1607, the division processing log [i] or the existing divided log [i] is restored to the state prior to the processing by vehicle log division processor 120 of vehicle log transmission device 10, i.e., to a divided log [i] obtained by dividing using the IDs.

(S1608) Vehicle log restorer 220 stores the division processing log [i] from after the processing of steps S1606 and S1607 as the divided log [i].

(S1609) Vehicle log restorer 220 determines whether or not i is N. When i is N (YES), vehicle log restorer 220 performs the processing of S1611, whereas when i is not N (NO), vehicle log restorer 220 performs the processing of S1610.

(S1610) Vehicle log restorer 220 adds 1 to i. Through steps S1609 and S1610, the processing from step 1603 to step S1608 can be performed a number of times equal to the number of divisions in the vehicle log.

(S1611) Vehicle log restorer 220 joins the N divided logs [i] in order from the lowest division number i, and sorts the divided logs in order from the earliest time.

(S1612) Vehicle log restorer 220 stores the N divided logs [i] from after the processing of step S1611 as the divided log [i].

Other Embodiments

As described thus far, Embodiment 1 has been given as an example of the technique according to the present disclosure. However, the technique in the present disclosure is not limited thereto, and can also be applied in embodiments in which modifications, replacements, additions, or omissions have been made as appropriate. For example, variations such as those described below are also included in the embodiments of the present disclosure.

(1) Although the foregoing embodiment is described as a security measure taken in a vehicle such as an automobile, the present disclosure is not limited to this application. The present disclosure is not limited to automobiles, and can be applied in mobility devices such as construction equipment, agricultural equipment, ships, rail cars, aircraft, and the like.

(2) Although the foregoing embodiment describes vehicle log transmission device 10 as being installed within a vehicle, vehicle log transmission device 10 may be an edge server that transmits a plurality of vehicle logs together, or may be a cloud server that collects vehicle logs.

(3) Although the foregoing embodiment describes vehicle log analysis server 20 as including anomalous log detector 270 and anomaly notifier 280, anomalous log detector 270 and anomaly notifier 280 are not required constituent elements. When vehicle log analysis server 20 does not include anomalous log detector 270 and anomaly notifier 280, for example, collected vehicle logs are analyzed manually, and evidence of an attack is detected as an anomaly.

(4) Although the foregoing embodiment describes the vehicle log as being an ECU system operation log or a CAN, CAN-FD, Ethernet, or FlexRay network log, the ECU may be an IVI (In-Vehicle Infotainment System) or a sensor device, the network may be LIN, MOST, or the like, and the configuration may be such that these are combined.

(5) Although the foregoing embodiment describes vehicle log transmission device 10 and vehicle log analysis server 20 as sharing the vehicle log division processing rules in advance, the vehicle log division processing rules may be updated each time vehicle log transmission device 10 transmits a vehicle log, or may be updated periodically by vehicle log analysis server 20. In this case, existing divided log storage 230 may hold different vehicle log division processing rules according to the number, type, and the like of the vehicle in which vehicle log transmission device 10 is installed.

(6) Although the foregoing embodiment describes existing identifier storage 150 as sharing the existing identifier list between vehicle log transmission device 10 and vehicle log analysis server 20 in advance, the vehicle log division processing rules may be updated each time vehicle log transmission device 10 transmits a vehicle log, or may be updated periodically by vehicle log analysis server 20.

(7) Although the foregoing embodiment describes vehicle-side communicator 170 as transmitting the division processing log or a hash value of the division processing log, data compressed using a compression algorithm such as LHA, ZIP, 7z, RAR, AFA, CAB, GCA, DGCA, StuffIt, Compact Pro, pack, compress, bzip, bzip2, or Zstandard.

(8) Although the foregoing embodiment describes vehicle log transmission necessity determiner 140 as referring to the existing identifier list stored in vehicle log transmission device 10 and determining whether it is necessary to transmit the divided log, the existing identifier list may be stored in vehicle log analysis server 20. In this case, vehicle log transmission necessity determiner 140 transmits the identifier of the division processing log to vehicle log analysis server 20, and when the identifier matches any one of the identifiers of the existing divided logs stored in vehicle log analysis server 20, a response indicating that the division processing log need not be transmitted is returned to vehicle log transmission necessity determiner 140. Vehicle log transmission necessity determiner 140 then transmits the identifier of the division processing log, and when the identifier of the existing divided log does not match, a response indicating that the division processing log needs to be transmitted is returned to vehicle log transmission necessity determiner 140, after which vehicle log transmission necessity determiner 140 transmits the division processing log. Additionally, vehicle log analysis server 20 may hold existing log lists for a plurality of vehicles for each type of vehicle. This makes it possible to further increase the likelihood that the division processing log and the existing divided log will match.

(9) Although the foregoing embodiment describes using a hash value as the identifier of the division processing log, a plurality of hash functions may be used and a combination of a plurality of hash values may be used as the identifier, or a combination of a hash value and a data size may be used as the identifier. Through this, identifiers and logs can be associated with each other even when a single hash value from different logs matches.

(10) Although the foregoing embodiment describes replacing the time information with time index information, sorting, and then performing data replacement even when the division processing log does not match with the existing identifier list, it is not absolutely necessary to perform this processing.

(11) Although the foregoing embodiment describes the division processing log as including times or a time index and the data as being replaced with predetermined values, this may be limited to information necessary for anomalous log detector 270 to detect an anomalous log. For example, when anomalous log detector 270 detects a situation where a value in a specific data region is greater than or equal to a predetermined value as an anomaly, time information, detailed data, and so on is not necessary, and the division processing log may be subjected to processing for deleting the time information, rounding the data, and so on. Additionally, when anomalous log detector 270 detects an anomaly using machine learning, a feature amount such as time-series difference information used in the machine learning may be used as the data of the division processing log.

(12) Although the foregoing embodiment describes anomaly notifier 280 as notifying a user of vehicle log analysis server 20 or the driver of an anomaly, the notification target may be the police, the Ministry of Transport, or organizations that share vulnerability information.

(13) The foregoing embodiment describes the vehicle log division processing rules as being created when vehicle log division processor 120 generates the division processing log from the vehicle log and shared between vehicle log transmission device 10 and vehicle log analysis server 20, but in lines of the vehicle log division processing rules where the processing item is "division", "sorting (ascending order)", or "data replacement", "processing Y/N", "value before processing", and "value after processing" may be shared in advance, rather than when the division processing log is generated. However, "value before processing" and "value after processing" cannot be shared when the processing item is "time index", and it is therefore necessary to create these when vehicle log division processor 120 generates the division processing log and dynamically share with vehicle log analysis server 20.

(14) Some or all of the constituent elements constituting the devices in the foregoing embodiment may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions of the constituent elements by the microprocessor operating in accordance with the computer program. The units of the constituent elements constituting the foregoing devices may be implemented individually as single chips, or may be implemented with a single chip including some or all of the devices. Although the term "system LSI" is used here, other names, such as IC, LSI, super LSI, ultra LSI, and so on may be used, depending on the level of integration. Furthermore, the method for implementing the integrated circuit is not limited to LSI; the circuit may be implemented through a dedicated circuit, a generic processor, or the like. An FPGA (Field Programmable Gate Array) capable of post-production programming or a reconfigurable processor in which the connections and settings of the circuit cells within the LSI can be reconfigured may be used as well. Furthermore, should technology for implementing integrated circuits that can replace LSI appear due to advancements in semiconductor technology or the appearance of different technologies, the integration of the above function blocks may be performed using such technology. Biotechnology applications are one such foreseeable example.

(15) Some or all of the constituent elements constituting the foregoing devices may be constituted by IC cards or stand-alone modules that can be removed from and mounted in the apparatus. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(16) The present disclosure can be implemented not only as vehicle log transmission device 10, vehicle log analysis server 20, and vehicle log analysis system 100, but also as a vehicle log transmission/reception method including steps of the processing performed by the elements constituting vehicle log analysis system 100.

Specifically, the method includes a vehicle log transmitting method performed by vehicle log transmission device 10 and a vehicle log receiving method performed by vehicle log analysis server 20. The vehicle log transmission/reception method transmits a vehicle log including a plurality of pieces of data respectively associated with IDs indicating a data type from vehicle log transmission device 10 to vehicle log analysis server 20. Vehicle log transmission device 10 includes existing identifier storage 150 that stores an existing identifier list, the existing identifier list being a list of identifiers corresponding to existing divided logs generated by dividing an existing vehicle log shared between vehicle log transmission device 10 and vehicle log analysis server 20 using IDs included in the existing vehicle log. Vehicle log analysis server 20 includes existing divided log storage 230 that stores an existing divided log list, the existing divided log list being a list of identifiers corresponding to the existing divided logs. As illustrated in FIG. 11, the vehicle log transmitting method includes: obtaining the vehicle log (step S1101); generating one or more divided logs by dividing the obtained vehicle log using the IDs included in the vehicle log (step S1102); generating an identifier for each of the one or more divided logs, and of the generated identifiers, determining that a divided log corresponding to an identifier present in the existing identifier list is a first divided log, and determining that a divided log corresponding to an identifier not present in the existing identifier list is a second divided log (steps S1104, S1105, and S1107); and transmitting the identifier corresponding to the first divided log to the vehicle log analysis server, and transmitting the second divided log to the vehicle log analysis server (steps S1110 and S1111). As illustrated in FIG. 12, the vehicle log receiving method includes: receiving an identifier corresponding to the first divided log and the second divided log transmitted in the transmitting (steps S1201 and S1203); restoring the vehicle log by referring to the existing divided log list when the identifier corresponding to the first divided log has been received, obtaining the existing divided log corresponding to the identifier in the existing divided log list, and joining the second divided log with the existing divided log (steps S1202, S1204, and S1206); and storing the restored vehicle log (step S1206).

(17) As one aspect of the present disclosure, the vehicle log transmission/reception method may be a program (a computer program) that implements these methods on a computer, or a digital signal constituting the computer program. Additionally, one aspect of the present disclosure may be computer programs or digital signals recorded in a computer-readable recording medium such as a flexible disk, hard disk, CD-ROM, MO, DVD, DVD-ROM, DVD-RAM, BD (Blu-ray (registered trademark) Disc), semiconductor memory, or the like. The constituent elements may also be the digital signals recorded in such a recording medium. Additionally, one aspect of the present disclosure may be realized by transmitting the computer program or digital signal via a telecommunication line, a wireless or wired communication line, a network such as the Internet, a data broadcast, or the like. Additionally, one aspect of the present disclosure may be a computer system including a microprocessor and memory, where the memory records the above-described computer program and the microprocessor operates in accordance with the computer program. Additionally, the present disclosure may be implemented by another independent computer system, by recording the program or the digital signal in the recording medium and transferring the recording medium, or by transferring the program or the digital signal over the network or the like.

(18) Aspects realized by combining the constituent elements and functions described in the foregoing embodiment and variations as desired are also included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

According to the in-vehicle network system and vehicle log analysis system of the present disclosure, the amount of data in a vehicle log transmitted between a vehicle and a server outside the vehicle can be reduced. As a result, a vehicle network log can be transmitted to an external server without preparing resources which enable large vehicle network logs to be communicated. This makes it possible to detect the unauthorized data infiltrating the vehicle network using a server outside the vehicle, and can therefore contribute to automobile safety.

What is claimed is:

1. A vehicle log transmission device that transmits, to a vehicle log analysis server, a vehicle log including a plurality of pieces of data respectively associated with identifiers, denoted as IDs indicating a data type, the vehicle log transmission device comprising:
   a hardware processor that obtains the vehicle log;
   the hardware processor generating one or more divided logs by dividing the obtained vehicle log using the IDs included in the vehicle log,
   existing identifier storage that stores an existing identifier list, the existing identifier list being a list of identifiers corresponding to existing divided logs generated by dividing an existing vehicle log shared between the vehicle log transmission device and the vehicle log analysis server using IDs included in the existing vehicle log, wherein
   the hardware processor generates an identifier for each of the one or more divided logs, and of the generated identifiers, determines that a divided log corresponding to an identifier present in the existing identifier list is a first divided log, and determines that a divided log corresponding to an identifier not present in the existing identifier list is a second divided log; and
   a vehicle-side communicator, wherein the vehicle-side communicator transmits the identifier corresponding to the first divided log to the vehicle log analysis server, and transmits the second divided log to the vehicle log analysis server.

2. The vehicle log transmission device according to claim 1,
   wherein the hardware processor generates the one or more divided logs by dividing the obtained vehicle log at each of the IDs included in the vehicle log, and
   the existing identifier storage stores the existing identifier list, the existing identifier list being a list corresponding to the existing divided logs generated by dividing the existing vehicle log at each of the IDs included in the existing vehicle log.

3. The vehicle log transmission device according to claim 1,
   wherein the vehicle log includes a plurality of pieces of data arranged in such a manner that a plurality of the IDs starting with a predetermined ID repeat in a cyclical manner,
   the hardware processor generates the one or more divided logs by dividing the obtained vehicle log at each of the plurality of the IDs, starting with the predetermined ID, included in the vehicle log, and
   the existing identifier storage stores the existing identifier list, the existing identifier list being a list of identifiers corresponding to the existing divided logs generated by dividing the existing vehicle log at each of the plurality of the IDs included in the existing vehicle log, starting with the predetermined ID.

4. The vehicle log transmission device according to claim 1,
   wherein the vehicle log includes the plurality of pieces of data, each associated with time information,
   the hardware processor further performs processing for replacing time information included in each of the one or more divided logs with time index information,
   the existing identifier storage further stores the existing identifier list, the existing identifier list being a list of identifiers corresponding to the existing divided logs in each of which time information has been replaced with time index information, and
   the vehicle-side communicator further transmits, to the vehicle log analysis server, a time list expressing a correspondence relationship between the time information and the time index information.

5. The vehicle log transmission device according to claim 4,
   wherein the hardware processor further performs processing that sorts the one or more divided logs in accordance with a magnitude of values of the IDs or values of the data included in the one or more divided logs, and
   the existing identifier storage further stores the existing identifier list, the existing identifier list being a list of identifiers corresponding to the existing divided logs sorted by the magnitude of the value of the IDs or the value of the data.

6. The vehicle log transmission device according to claim 1,
   wherein the hardware processor further performs replacement processing for replacing values of the data included in the one or more divided logs with a predetermined value or rounding processing that rounds the value of the data, and
   the existing identifier storage further stores the existing identifier list, the existing identifier list being a list of identifiers corresponding to the existing divided logs which have been subjected to the replacement processing or the rounding processing.

7. The vehicle log transmission device according to claim 1, wherein the hardware processor registers, in the existing identifier list, an identifier corresponding to a divided log determined to be the second divided log by the hardware processor.

8. A vehicle log analysis server that receives, from a vehicle log transmission device, a vehicle log including a plurality of pieces of data respectively associated with identifiers, denoted as IDs indicating a data type, the vehicle log analysis server comprising:
- a server-side communicator, wherein the server-side communicator receives, from the vehicle log transmission device, an identifier corresponding to a first divided log among one or more divided logs generated by dividing the vehicle log using IDs included in the vehicle log, and a second divided log, among the one or more divided logs, that is not the first divided log;
- existing divided log storage that stores an existing divided log list, the existing divided log list being a list of existing divided logs generated by dividing an existing vehicle log shared between the vehicle log transmission device and the vehicle log analysis server using IDs included in the existing vehicle log and identifiers corresponding to the existing divided logs;
- a hardware processor that restores the vehicle log by referring to the existing divided log list when the identifier corresponding to the first divided log is received, obtaining the existing divided log corresponding to the identifier in the existing divided log list, and joining the second divided log with the existing divided log; and
- vehicle log storage that stores the restored vehicle log.

9. The vehicle log analysis server according to claim 8, wherein the server-side communicator receives, from the
- vehicle log transmission device, an identifier corresponding to the first divided log among the one or more divided logs generated by dividing the vehicle log at each of the IDs included in the vehicle log, and the second divided log among the one or more divided logs, and
- the existing divided log storage stores the existing divided log list, the existing divided log list being a list of the existing divided logs generated by dividing the existing vehicle log at each of the IDs included in the existing vehicle log and identifiers corresponding to the existing divided logs.

10. The vehicle log analysis server according to claim 8, wherein the vehicle log includes a plurality of pieces of data arranged in such a manner that a plurality of the IDs starting with a predetermined ID repeat in a cyclical manner,
- the server-side communicator receives, from the vehicle log transmission device, an identifier corresponding to the first divided log among the one or more divided logs generated by dividing the vehicle log at each of the plurality of the IDs, starting with the predetermined ID, included in the vehicle log, and the second divided log among the one or more divided logs, and
- the existing divided log storage stores the existing divided log list, the existing divided log list being a list of the existing divided logs generated by dividing the existing vehicle log at each of the plurality of the IDs, starting with the predetermined ID, included in the existing vehicle log and identifiers corresponding to the existing divided logs.

11. The vehicle log analysis server according to claim 8, wherein
- the hardware processor monitors the restored vehicle log and detects a case where the restored vehicle log contains evidence of an attack as an anomaly; and
- the hardware processor notifies a predetermined notification target that there is an anomaly in the vehicle.

12. The vehicle log analysis server according to claim 11, wherein the hardware processor further:
- holds an anomalous identifier list, the anomalous identifier list being a list of identifiers corresponding to anomalous divided logs generated by dividing a vehicle log previously determined to be anomalous using IDs included in the vehicle log,
- when the server-side communicator receives an identifier corresponding to the first divided log, detects an anomaly when the identifier is included in the anomalous identifier list,
- when the server-side communicator has received the second divided log, detects the second divided log as an anomalous log when the second divided log contains evidence of an attack, and
- registers an anomalous divided log generated by dividing the anomalous log using IDs included in the anomalous log in the anomalous identifier list.

13. The vehicle log analysis server according to claim 8, wherein the vehicle log includes the plurality of pieces of data, each associated with time information,
- the server-side communicator receives, from the vehicle log transmission device, an identifier corresponding to the first divided log among the one or more divided logs in which time information has been replaced with time index information, the second divided log among the one or more divided logs, and a time list expressing a correspondence relationship between the time information and the time index information,
- the existing divided log storage further stores the existing divided log list, the existing divided log list being a list of the existing divided logs in which the time information has been replaced with the time index information and identifiers corresponding to the existing divided logs, and
- the hardware processor restores the vehicle log by referring to the existing divided log list when the identifier corresponding to the first divided log is received, obtaining the existing divided log corresponding to the identifier in the existing divided log list, referring to the time list and replacing the time index information included in the existing divided log with time information, and joining the second divided log with the existing divided log.

14. The vehicle log analysis server according to claim 13, wherein the server-side communicator receives an identifier corresponding to the first divided log among the one or more divided logs sorted by a magnitude of a value of an ID or a value of data, and the second divided log among the one or more divided logs,
- the existing divided log storage further stores the existing divided log list, the existing divided log list being a list of the existing divided logs sorted by the magnitude of the value of the IDs or the value of the data, and the identifiers corresponding to the existing divided logs, and
- the hardware processor restores the vehicle log by referring to the existing divided log list when the identifier corresponding to the first divided log is received, obtaining the existing divided log corresponding to the identifier in the existing divided log list, referring to the time list and replacing the time index information in the existing divided log with time information, referring to the replaced time information and sorting the existing divided logs in order from the earliest time, and joining the second divided log with the existing divided log.

15. The vehicle log analysis server according to claim 8, wherein the server-side communicator receives an identifier corresponding to the first divided log among the one or more divided logs subjected to replacement processing for replacing a value of data with a predetermined value or rounding processing that rounds the value of the data, and the second divided log among the one or more divided logs, and the existing divided log storage further stores the existing divided log list, the existing divided log list being a list of the existing divided logs subjected to the replacement processing or the rounding processing, and identifiers corresponding to the existing divided logs.

16. The vehicle log analysis server according to claim 8, wherein the hardware processor, when the second divided log is received, generates an identifier corresponding to the second divided log, and registers the second divided log and the identifier in the existing divided log list.

17. A vehicle log analysis system comprising:
a vehicle log transmission device; and
a vehicle log analysis server,
wherein the vehicle log analysis system transmits a vehicle log including a plurality of pieces of data respectively associated with identifiers, denoted as IDs indicating a data type, from the vehicle log transmission device to the vehicle log analysis server,
the vehicle log transmission device includes:
a first hardware processor that obtains the vehicle log;
the first hardware processor generating one or more divided logs by dividing the obtained vehicle log using the IDs included in the vehicle log;
existing identifier storage that stores an existing identifier list, the existing identifier list being a list of identifiers corresponding to existing divided logs generated by dividing an existing vehicle log shared between the vehicle log transmission device and the vehicle log analysis server using IDs included in the existing vehicle log, wherein
the first hardware processor generates an identifier for each of the one or more divided logs, and of the generated identifiers, determines that a divided log corresponding to an identifier present in the existing identifier list is a first divided log, and determines that a divided log corresponding to an identifier not present in the existing identifier list is a second divided log; and
a vehicle-side communicator, wherein the vehicle-side communicator transmits the identifier corresponding to the first divided log to the vehicle log analysis server, and transmits the second divided log to the vehicle log analysis server, and
the vehicle log analysis server includes:
a server-side communicator, wherein the server-side communicator receives an identifier corresponding to the first divided log and the second divided log transmitted from the vehicle-side communicator;
existing divided log storage that stores an existing divided log list, the existing divided log list being a list of identifiers corresponding to the existing divided logs;
a second hardware processor that restores the vehicle log by referring to the existing divided log list when the identifier corresponding to the first divided log is received, obtaining the existing divided log corresponding to the identifier in the existing divided log list, and joining the second divided log with the existing divided log; and
a vehicle log storage that stores the restored vehicle log.

18. The vehicle log analysis system according to claim 17, wherein
the first hardware processor generates the one or more divided logs by dividing the obtained vehicle log at each of the IDs included in the vehicle log,
the existing identifier storage stores the existing identifier list, the existing identifier list being a list corresponding to the existing divided logs generated by dividing the existing vehicle log at each of the IDs included in the existing vehicle log,
the server-side communicator receives an identifier corresponding to the first divided log among the one or more divided logs, and the second divided log among the one or more divided logs, transmitted from the vehicle-side communicator, and
the existing divided log storage stores the existing divided log list, the existing divided log list being a list of the existing divided logs generated by dividing the existing vehicle log at each of the IDs included in the existing vehicle log and identifiers corresponding to the existing divided logs.

19. The vehicle log analysis system according to claim 17, wherein
the vehicle log includes a plurality of pieces of data arranged in such a manner that a plurality of the IDs starting with a predetermined ID repeat in a cyclical manner,
the first hardware processor generates the one or more divided logs by dividing the obtained vehicle log at each of the plurality of the IDs, starting with the predetermined ID, included in the vehicle log,
the existing identifier storage stores the existing identifier list, the existing identifier list being a list of identifiers corresponding to the existing divided logs generated by dividing the existing vehicle log at each of the plurality of the IDs, starting with the predetermined ID, included in the existing vehicle log,
the server-side communicator receives an identifier corresponding to the first divided log among the one or more divided logs, and the second divided log among the one or more divided logs, transmitted from the vehicle-side communicator, and
the existing identifier storage stores the existing divided log list, the existing divided log list being a list of the existing divided logs generated by dividing the existing vehicle log at each of the IDs included in the existing vehicle log and identifiers corresponding to the existing divided logs.

20. The vehicle log analysis system according to claim 17, wherein
the vehicle log includes the plurality of pieces of data, each associated with time information,
the first hardware processor further performs processing for replacing time information included in the one or more divided logs with time index information, the existing identifier storage further stores the existing identifier list, the existing identifier list being a list of identifiers corresponding to the existing divided logs in which time information has been replaced with time index information,
the vehicle-side communicator further transmits, to the vehicle log analysis server, a time list expressing a correspondence relationship between the time information and the time index information,
the server-side communicator further receives the time list from the vehicle-side communicator, the existing divided log storage further stores the existing divided log list, the existing divided log list being a list of the existing divided logs in which the time information has been replaced with the time index information and identifiers corresponding to the existing divided logs, and the second hardware processor restores the vehicle log by referring to the existing divided log list when the identifier corresponding to the first divided log is received, obtaining the existing divided log corresponding to the identifier in the existing divided log list, referring to the time list and replacing the time index information included in the existing divided log with time information, and joining the second divided log with the existing divided log.

21. The vehicle log analysis system according to claim 20, wherein the first hardware processor further performs processing that sorts the one or more divided logs in accordance with a magnitude of values of the IDs or values of the data included in the one or more divided logs, the existing identifier storage further stores the existing identifier list, the existing identifier list being a list of identifiers corresponding to the existing divided logs sorted by the magnitude of the value of the IDs or the value of the data, the server-side communicator receives an identifier corresponding to the first divided log among the one or more divided logs sorted by a magnitude of a value of an ID or a value of data, and the second divided log among the one or more divided logs, the existing divided log storage further stores the existing divided log list, the existing divided log list being a list of the existing divided logs sorted by the magnitude of the value of the IDs or the value of the data, and the identifiers corresponding to the existing divided logs, and the second hardware processor restores the vehicle log by referring to the existing divided log list when the identifier corresponding to the first divided log is received, obtaining the existing divided log corresponding to the identifier in the existing divided log list, referring to the time list and replacing the time index information in the existing divided log with time information, referring to the replaced time information and sorting the existing divided logs in order from the earliest time, and joining the second divided log with the existing divided log.

22. The vehicle log analysis system according to claim 17, wherein the first hardware processor further performs replacement processing for replacing values of the data included in the one or more divided logs with a predetermined value or rounding processing that rounds the value of the data, the existing identifier storage further stores the existing identifier list, the existing identifier list being a list of identifiers corresponding to the existing divided logs which have been subjected to the replacement processing or the rounding processing, the server-side communicator receives an identifier corresponding to the first divided log among the one or more divided logs subjected to the replacement processing or the rounding processing, and the second divided log among the one or more divided logs, and the existing divided log storage further stores the existing divided log list, the existing divided log list being a list of the existing divided logs subjected to the replacement processing or the rounding processing, and identifiers corresponding to the existing divided logs.

23. The vehicle log analysis system according to claim 17, wherein the second hardware processor monitors the restored vehicle log and detects a case where the restored vehicle log contains evidence of an attack as an anomaly; and notifies a predetermined notification target that there is an anomaly in the vehicle.

24. The vehicle log analysis system according to claim 23, wherein the second hardware processor further:

holds an anomalous identifier list, the anomalous identifier list being a list of identifiers corresponding to anomalous divided logs generated by dividing a vehicle log previously determined to be anomalous using IDs included in the vehicle log, when the server-side communicator has received an identifier corresponding to the first divided log, detects an anomaly when the identifier is included in the anomalous identifier list, when the server-side communicator has received the second divided log, detects the second divided log as an anomalous log when the second divided log contains evidence of an attack, and registers an anomalous divided log generated by dividing the anomalous log using IDs included in the anomalous log in the anomalous identifier list.

25. The vehicle log analysis system according to claim 17, wherein the first hardware processor further registers, in the existing identifier list, an identifier corresponding to a divided log determined to be the second divided log by the first hardware processor, and the second hardware processor further generates an identifier corresponding to the second divided log, and registers the second divided log and the identifier in the existing divided log list when the second divided log is received.

26. The vehicle log analysis system according to claim 17, wherein the first hardware processor obtains, as the vehicle log, at least one of the following: an in-vehicle network log according to the CAN or CAN-FD protocol, the in-vehicle network log including a frame identifier, denoted as ID, as the ID of the vehicle log; an in-vehicle network log according to the FlexRay (registered trademark) protocol, the in-vehicle network log including a slot ID as the ID of the vehicle log; an in-vehicle network log according to the Ethernet (registered trademark) protocol, the in-vehicle network log including an IP address as the ID of the vehicle log; and a system operation log including a process number as the ID of the vehicle log.

27. A vehicle log transmission method for transmitting, to a vehicle log analysis server, a vehicle log including a plurality of pieces of data respectively associated with identifiers, denoted as IDs, indicating a data type, the vehicle log transmission method comprising:

obtaining the vehicle log;

generating one or more divided logs by dividing the obtained vehicle log using the IDs included in the vehicle log;

storing an existing identifier list, the existing identifier list being a list of identifiers corresponding to existing divided logs generated by dividing an existing vehicle log shared between a vehicle log transmission device and a vehicle log analysis server using IDs included in the existing vehicle;

generating an identifier for each of the one or more divided logs, and of the generated identifiers, determines that a divided log corresponding to an identifier present in the existing identifier list is a first divided log, and determines that a divided log corresponding to an identifier not present in the existing identifier list is a second divided log; and transmitting the identifier corresponding to the first divided log to the vehicle log analysis server, and transmitting the second divided log to the vehicle log analysis server.

28. A vehicle log reception method for receiving with a vehicle log analysis server from a vehicle log transmission device, a vehicle log including a plurality of pieces of data respectively associated with identifiers, denoted as IDs, indicating a data type, the method comprising:

receiving, from the vehicle log transmission device, an identifier corresponding to a first divided log among one or more divided logs generated by dividing the vehicle log using IDs included in the vehicle log, and a second divided log, among the one or more divided logs, that is not the first divided log;

storing an existing divided log list, the existing divided log list being a list of existing divided logs generated by dividing an existing vehicle log shared between the vehicle log transmission device and the vehicle log analysis server using IDs included in the existing vehicle log and identifiers corresponding to the existing divided logs;

restoring the vehicle log by referring to the existing divided log list when the identifier corresponding to the first divided log is received, obtaining the existing divided log corresponding to the identifier in the existing divided log list, and joining the second divided log with the existing divided log; and storing the restored vehicle log.

\* \* \* \* \*